(12) United States Patent
Iizawa et al.

(10) Patent No.: US 11,493,185 B2
(45) Date of Patent: Nov. 8, 2022

(54) ILLUMINATING DEVICE

(71) Applicant: Panasonic Intellectual Property Management Co., Ltd., Osaka (JP)

(72) Inventors: Noboru Iizawa, Osaka (JP); Masahito Yamana, Hyogo (JP); Kazuyuki Yamae, Nara (JP); Tetsuya Nishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/423,081

(22) PCT Filed: Dec. 18, 2019

(86) PCT No.: PCT/JP2019/049522
§ 371 (c)(1),
(2) Date: Jul. 14, 2021

(87) PCT Pub. No.: WO2020/153052
PCT Pub. Date: Jul. 30, 2020

(65) Prior Publication Data
US 2022/0082230 A1    Mar. 17, 2022

(30) Foreign Application Priority Data
Jan. 24, 2019    (JP) .............................. JP2019-010373

(51) Int. Cl.
*F21V 9/30*    (2018.01)
*F21V 7/00*    (2006.01)
(Continued)

(52) U.S. Cl.
CPC .............. *F21V 9/30* (2018.02); *F21V 7/0025* (2013.01); *G02B 6/001* (2013.01); *G02B 6/0006* (2013.01); *F21V 29/502* (2015.01)

(58) Field of Classification Search
CPC ............. B60R 16/0215; F21Y 2115/30; F21Y 2105/10; F21V 13/14; F21V 9/20; F21V 13/08
See application file for complete search history.

(56) References Cited

U.S. PATENT DOCUMENTS 9,109,771 B2 *  8/2015  Takahashi ............... F21S 41/25
9,816,677 B2    11/2017 Takahashi et al.
(Continued)

FOREIGN PATENT DOCUMENTS

JP    2011-134619 A    7/2011
JP    2012-074355 A    4/2012
(Continued)

OTHER PUBLICATIONS

International Search Report issued in corresponding International Patent Application No. PCT/JP2019/049522, dated Mar. 17, 2020, with English translation.

(Continued)

*Primary Examiner* — William J Carter
(74) *Attorney, Agent, or Firm* — McDermott Will & Emery LLP

(57) ABSTRACT

An illuminating device according to the present disclosure is of a reflective type and uses a laser beam. The illuminating device includes: a laser element that emits a laser beam; an optical fiber that transmits the laser beam emitted by the laser element; a phosphor layer that converts a wavelength of light incident on one of surfaces and emits the light through the one of the surfaces; and an optical component that causes reflected light of the laser beam transmitted through the optical fiber to be incident on the one of the surfaces of the phosphor layer. With the illuminating device, (Continued)

an intensity distribution of the light incident on the one of the surfaces of the phosphor layer is sparse at a central region.

12 Claims, 18 Drawing Sheets

(51) Int. Cl.
*F21V 8/00* (2006.01)
*F21V 29/502* (2015.01)

(56) References Cited

U.S. PATENT DOCUMENTS

| 10,240,974 | B2* | 3/2019 | Takahashi | G01J 1/0411 |
| 2012/0051074 | A1* | 3/2012 | Takahashi | F21S 41/176 |
| | | | | 362/509 |
| 2012/0106178 | A1 | 5/2012 | Takahashi et al. | |
| 2012/0106188 | A1 | 5/2012 | Takahashi et al. | |
| 2013/0058114 | A1 | 3/2013 | Reiners | |
| 2013/0194822 | A1* | 8/2013 | Aikawa | G02B 5/1861 |
| | | | | 362/583 |
| 2013/0258689 | A1 | 10/2013 | Takahira et al. | |
| 2017/0205034 | A1 | 7/2017 | Lau et al. | |
| 2018/0224080 | A1 | 8/2018 | Reisinger et al. | |

FOREIGN PATENT DOCUMENTS

| JP | 2012-104267 A | 5/2012 |
| JP | 2012-109201 A | 6/2012 |
| JP | 2013-526759 A | 6/2013 |
| JP | 2013-219063 A | 10/2013 |
| JP | 2014-010917 A | 1/2014 |
| JP | 2014-017094 A | 1/2014 |
| JP | 5675306 B2 | 2/2015 |
| JP | 2015-210872 A | 11/2015 |
| WO | 2017/020054 A1 | 2/2017 |

OTHER PUBLICATIONS

Extended European Search Report dated Feb. 24, 2022 issued in corresponding European Patent Application No. 19911488.5.

* cited by examiner

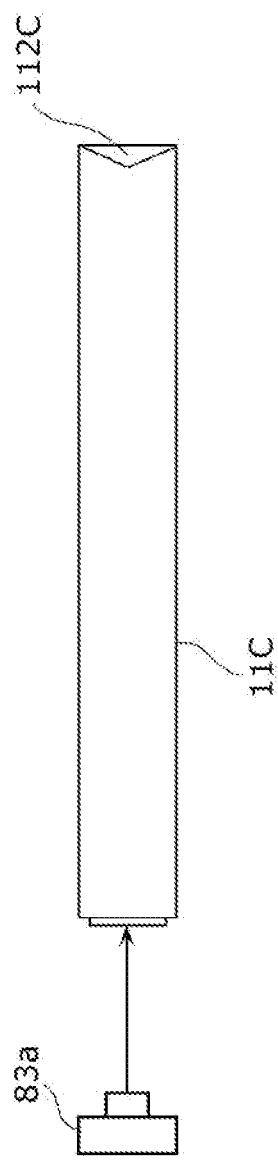

ILLUMINATING DEVICE

CROSS-REFERENCE OF RELATED APPLICATIONS

This application is the U.S. National Phase under 35 U.S.C. § 371 of International Patent Application No. PCT/JP2019/049522, filed on Dec. 18, 2019, which in turn claims the benefit of Japanese Application No. 2019-010373, filed on Jan. 24, 2019, the entire disclosures of which Applications are incorporated by reference herein.

TECHNICAL FIELD

The present disclosure relates to an illuminating device using a laser beam.

BACKGROUND ART

There is lighting using a solid-state light source such as a laser. In such lighting, a phosphor is irradiated with blue light emitted by the solid-state light source, thereby producing white light. The phosphor scatters yellow light excited by a portion of the blue light and a remaining portion of the blue light transmitted. As a result, it is possible to produce white light that is a mixture of these colors.

Meanwhile, a solid-state light source such as a laser is high in directivity and an energy density. For that reason, when a phosphor is directly irradiated with blue light emitted by a solid-state light source, the phosphor generates a large amount of heat in an irradiated region, and thus the temperature of the phosphor increases. Phosphors have a temperature quenching property that the wavelength conversion efficiency decreases as the temperature increases. Accordingly, it is necessary to inhibit an increase in the temperature of the phosphors.

For example, Patent Literature (PTL) 1 discloses an illuminating device in which a diffusion member for diffusing light emitted by a solid-state light source is provided above a phosphor layer. According to PTL 1, the diffusion member diffuses energy distribution of light emitted by the solid light source, thereby preventing energy concentration on the phosphor layer (i.e., reducing the heat load) and inhibiting an increase in temperature of the phosphor layer.

CITATION LIST

Patent Literature

[PTL 1] Japanese Unexamined Patent Application Publication No. 2012-104267

SUMMARY OF INVENTION

Technical Problem

However, with the above-described conventional technique, although the heat load on the phosphor layer can be alleviated and an increase in temperature of the phosphor layer can be inhibited, there is a problem that a portion of the light emitted by the solid light source is scattered and lost by diffusion. In other words, the above-described conventional technique has a problem that it is difficult to increase the output of the illuminating device.

The present disclosure is conceived in view of the aforementioned problem and has an object to provide an illuminating device capable of increasing an output while inhibiting an increase in temperature of a phosphor layer.

Solution to Problem

In order to achieve the above-described object, an illuminating device according to an aspect of the present disclosure is an illuminating device of a reflective type that uses a laser beam, and includes. The illuminating device includes: a laser element that emits a laser beam; an optical fiber that transmits the laser beam emitted by the laser element; a phosphor layer that converts a wavelength of light incident on one of surfaces and emits the light through the one of the surfaces; and an optical component that causes reflected light of the laser beam transmitted through the optical fiber to be incident on the one of the surfaces of the phosphor layer. With the illuminating device, an intensity distribution of the light incident on the one of the surfaces of the phosphor layer is sparse at a central region.

Advantageous Effects of Invention

An illuminating device according to the present disclosure is capable of increasing output while inhibiting an increase in temperature of a phosphor layer.

BRIEF DESCRIPTION OF DRAWINGS

FIG. 17 is a schematic cross-sectional view illustrating an optical fiber according to Embodiment 3.

DESCRIPTION OF EMBODIMENTS

Hereinafter, embodiments of the present disclosure will be described with reference to the drawings. It should be noted that the subsequently-described embodiment shows a specific example of the present disclosure. Thus, the numerical values, shapes, materials, structural components, the arrangement and connection of the structural components, and others described in the following embodiments are mere examples, and do not intend to limit the present disclosure. Furthermore, among the structural components in the following embodiments, components not recited in the independent claims which indicate the broadest concepts of the present disclosure are described as arbitrary structural components.

It should be noted that the respective figures are schematic diagrams and are not necessarily precise illustrations. Furthermore, in the respective figures, substantially identical components are assigned the same reference signs, and overlapping description is omitted or simplified.

Embodiment 1

Illuminating Device

The following describes an illuminating device according to Embodiment 1.

Figure 1:
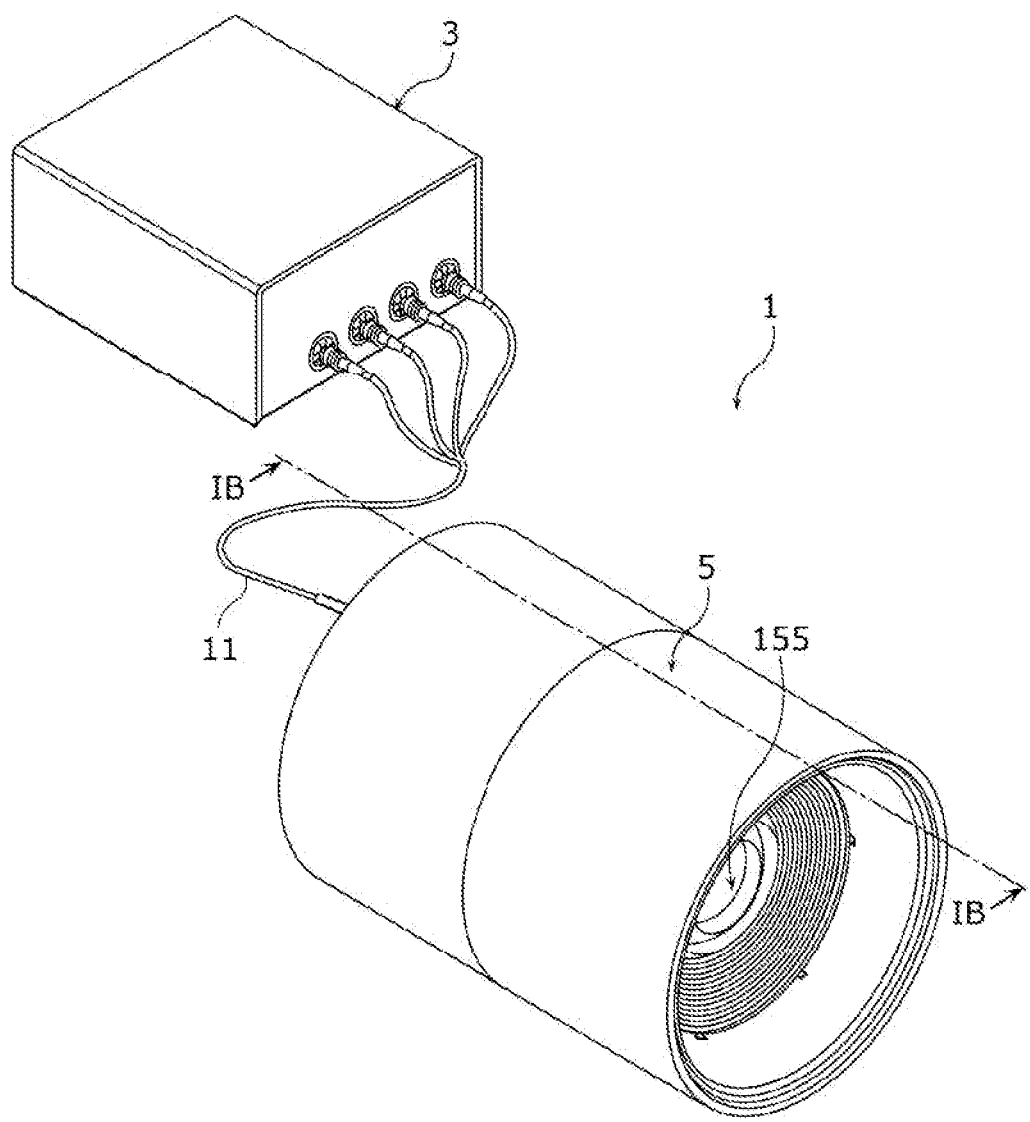
FIG. 1 is a perspective view illustrating an illuminating device according to Embodiment 1.
Figure 2:
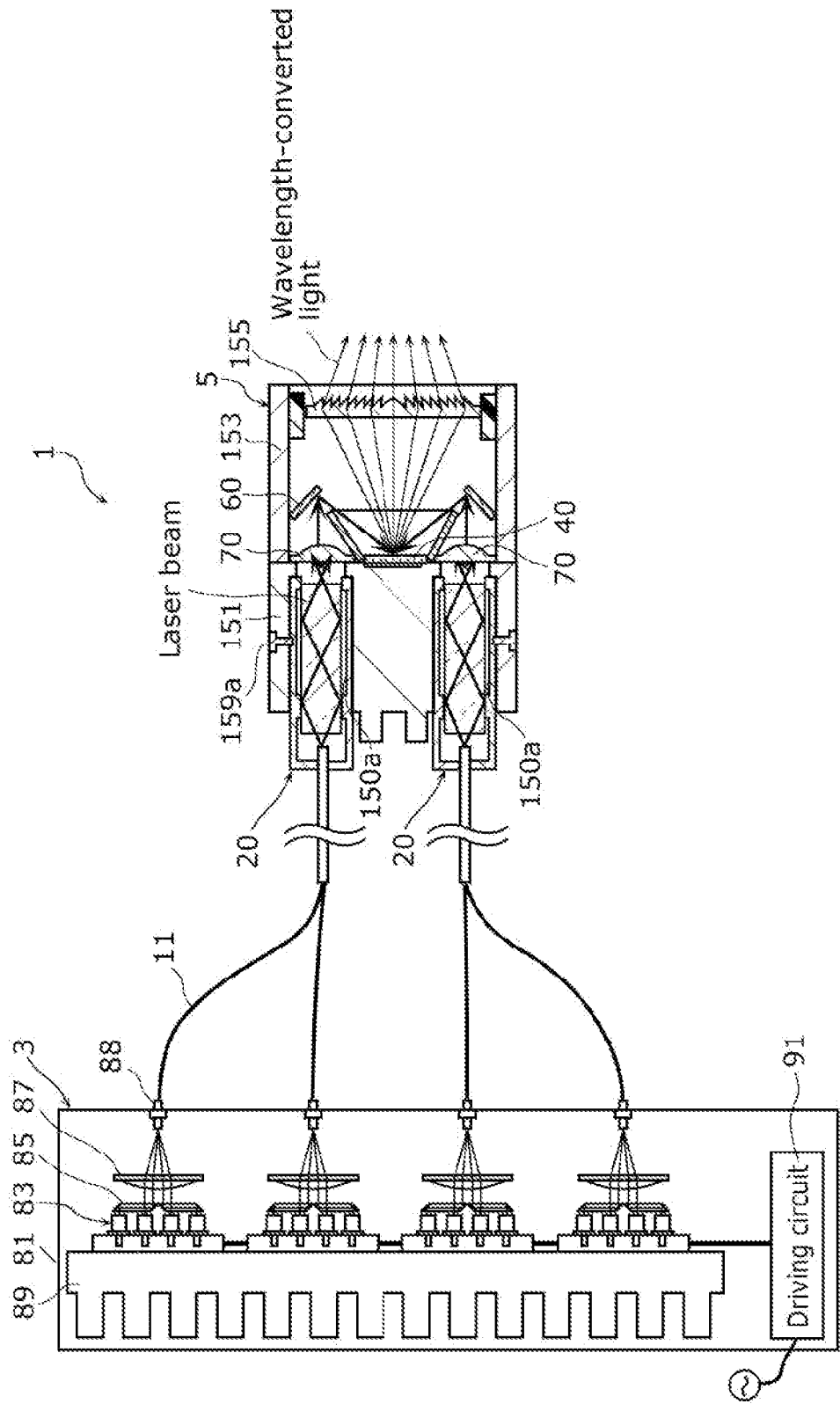
FIG. 2 is a schematic diagram illustrating an excitation light source in the illuminating device according to Embodiment 1, and a cross-sectional view illustrating a luminaire, etc. taken along the line IB-IB of FIG. 1.
Figure 3:
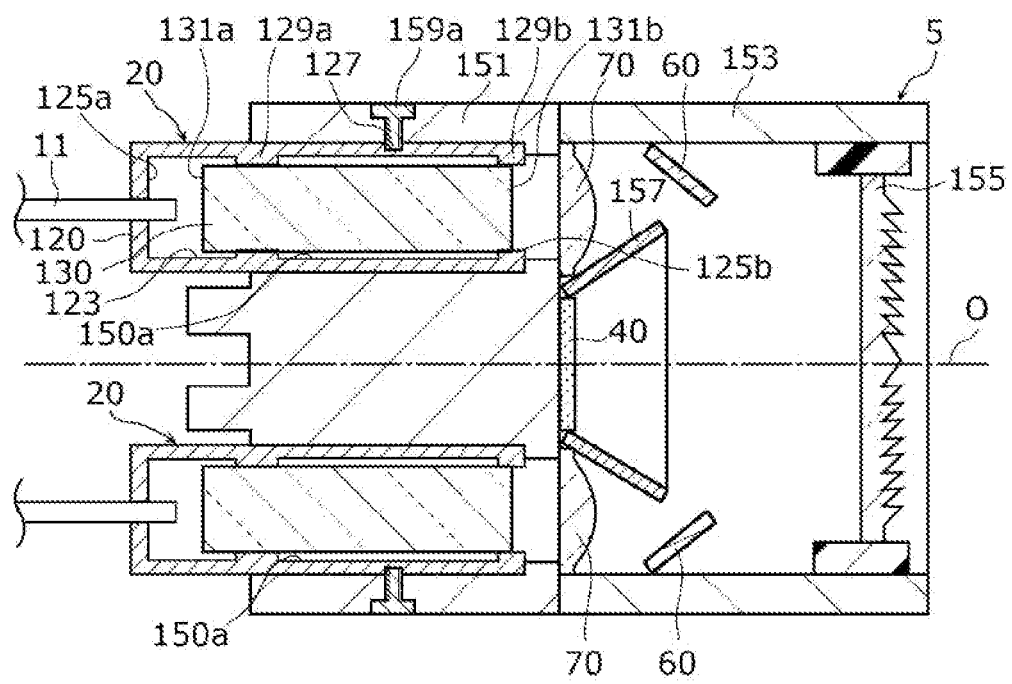
FIG. 3 is a partially enlarged cross-sectional diagram illustrating the illuminating device according to Embodiment 1.

FIG. 1 is a perspective view of illuminating device 1 according to Embodiment 1. FIG. 2 is a schematic diagram illustrating excitation light source 3 in illuminating device 1 according to Embodiment 1, and a cross-sectional view illustrating luminaire 5, etc. taken along the line IB-IB of FIG. 1. FIG. 3 is a partially enlarged cross-sectional diagram illustrating illuminating device 1 according to Embodiment 1.

Illuminating device 1 is an illuminating device of a reflective type that uses a laser beam. Illuminating device 1 includes, for example, excitation light source 3, luminaire 5, a plurality of optical fibers 11, and optical connector 20 as illustrated in FIG. 1 and FIG. 2. Illuminating device 1 is used, for example, as a downlight, a spotlight, etc. The following describes the details of the structural components. Here, an illuminating device of a reflective type that uses a laser beam is a device in which a laser beam is reflected by an optical component placed further in front of a phosphor layer and emitted to a front surface of the phosphor layer, and reflected light resulting from wavelength conversion is output from the front surface of the phosphor layer.

Excitation Light Source 3

Excitation light source 3 is a device that includes at least one laser element, and emits a laser beam. According to the present embodiment, excitation light source 3 includes at least two laser elements. Excitation light source 3 includes, for example, housing 81, a plurality of laser elements 83, a plurality of prisms 85, a plurality of lenses 87, heat sink 89, and driving circuit 91 as illustrated in FIG. 2.

Housing 81

Housing 81 is a casing portion of excitation light source 3 illustrated in FIG. 1. As illustrated in FIG. 2, housing 81 houses the plurality of laser elements 83, the plurality of prisms 85, the plurality of lenses 87, a plurality of ferrules 88, heat sink 89, and driving circuit 91.

Laser Element 83

The plurality of laser elements 83 are each emit a laser beam. The plurality of laser elements 83 are mounted on a substrate, and connected thermally to heat sink 89 via the substrate. In the example illustrated in FIG. 2, some of the plurality of laser elements 83 are grouped as a set. A set of laser elements 83 emits a laser beam to prism 85, thereby causing the laser beam to be incident on an entrance surface that is a first end face of optical fiber 11.

Laser elements 83 may each include a semiconductor laser, or may each include, for example, InGaN laser diode and AlInGaN laser diode. Laser elements 83 may each be, for example, a light emitting diode (LED) as long as a beam emitted therefrom can excite a phosphor.

It should be noted that an output of laser beams emitted by laser elements 83 is controlled by driving circuit 91. The laser beams emitted by laser elements 83 each have a predetermined wavelength in a wavelength range from violet to blue.

Prisms 85 are each a light-transmissive component having a plate-like shape. Prism 85 causes a laser beam emitted from a set of laser elements 83 to be incident on lens 87.

Prism 85 is placed so as to be orthogonal to an optical axis of the laser beam emitted by laser elements 83. Stated differently, prism 85 is placed so as to face a set of laser elements 83.

As described above, each of the plurality of prisms 85 has a function of a light guide for guiding a laser beam emitted by a set of laser elements 83 to a corresponding one of lenses 87.

Lens 87

Lenses 87 are placed so as to face prisms 85 in a one-to-one relationship. Lens 87 condenses laser beams that have exited through prism 85 so as to be incident on the first end face of optical fiber 11. It should be noted that, each of the plurality of lenses 87 is a convex lens in the example illustrated in FIG. 2, but may be a concave lens.

Ferrule 88

Each of the plurality of ferrules 88 is fixed to housing 81, and holds the first end of a corresponding one of optical fibers 11. In other words, ferrule 88 holds the first end of optical fiber 11 so as to cause a laser beam that has exited through lens 87 to enter optical fiber 11.

Heat Sink 89

Heat sink 89 is a heat dissipation component for dissipating heat generated in the plurality of laser elements 83, and has a plurality of fins. In addition, the substrate on which laser elements 83 are mounted is fixed to Heat sink 89.

Driving Circuit 91

Driving circuit 91 is electrically connected to a power system by a power-line wire or the like, and feeds power to each of laser elements 83. Driving circuit 91 drives and controls an output of each of laser elements 83 such that each of laser elements 83 emits a predetermined laser beam.

Driving circuit 91 may have a function of dimming a laser beam emitted by each of laser elements 83. Driving circuit 91 may include an oscillator or the like that drives laser elements 83 based on a pulse signal.

Optical Fiber 11

Optical fiber 11 is a transmission body having a duplex structure, for example, in which a core with a high refractive index is surrounded by a clad layer with a lower refractive index than the refractive index of the core. Optical fiber 11 transmits a laser beam emitted by laser elements 83. According to the present embodiment, at least two optical fibers 11 are provided, and the at least two optical fibers 11 each transmit a laser beam emitted by a corresponding laser element out of the at least two laser elements 83. In the example illustrated in FIG. 2, four optical fibers 11 are provided. The laser beam emitted by excitation light source 3 enters optical fiber 11 through the first end of optical fiber 11, and exits optical fiber 11 through the second end of optical fiber 11.

It should be noted that the first end of optical fiber 11 is upstream of the optical path along which the laser beam is transmitted, and the second end of optical fiber 11 is downstream of the optical path along which the laser beam is transmitted.

Optical Connector 20

Optical connector 20 combines into one and emits laser beams transmitted through at least one optical fiber 11. In the example illustrated in FIG. 2, each of the two optical connectors 20 combines into one and emits laser beams of two sets of laser elements 83 which have been transmitted through two optical fibers 11. However, laser beams of three or more sets of laser elements 83 may be combined into one and emitted. In this manner, optical connectors 20 each mix the respective laser beams transmitted through the plurality of optical fibers 11, and emit the mixed laser beams.

In addition, optical connector 20 is detachable from luminaire 5. Optical connector 20 is, for example, fixed to luminaire 5 by fixing member such as a screw or the like.

According to the present embodiment, optical connector 20 includes casing 120 and optical component 130 as illustrated in FIG. 3.

Casing 120

Casing 120 is a tubular body that houses optical component 130. Casing 120 includes, for example, a metal material such as aluminum, iron, etc. Casing 120 includes space 123 through which a laser beam passes. More specifically, casing 120 is provided with first end opening 125a, second end opening 125b, engaging portion 127, support piece 129a, support piece 129b, first end face 131a, and second end face 131b, as illustrated in FIG. 3.

First end opening 125a and second end opening 125b are located at a first end and a second end of casing 120, respectively. Optical fiber 11 that transmits a laser beam is inserted to first end opening 125a to fill first end opening 125a. The laser beam passes through second end opening 125b.

Space 123 is a space extending from first end opening 125a to second end opening 125b of casing 120, and a laser beam passes through space 123. In other words, a laser beam passes from first end opening 125a to second end opening 125b in space 123.

Engaging portion 127 is formed on an outer peripheral surface of casing 120, and engages with fixing member for fixing to luminaire 5, such as a male screw, for example. Engaging portion 127 is, for example, a recess portion of casing 120 into which fixing member is inserted, or a protrusion portion or the like of casing 120 that inhibits the movement of optical connector 20 by being in contact with fixing member 159.

Support piece 129a and support piece 129b are formed in an annular shape inside casing 120, and fix optical component 130.

Optical Component 130

Optical component 130 receives laser beams transmitted through optical fiber 11, mixes the laser beams inside, and emits the laser beams that have been mixed.

Optical component 130 is fitted inside casing 120, and fixed by support piece 129a and support piece 129b. First end face 131a of optical component 130 faces first end opening 125a of casing 120, and second end face 131b of optical component 130 faces second end opening 125b of casing 120. In other words, first end face 131a is an entrance surface for a laser beam, and second end face 131b of optical component 130 is an exit surface for the laser beam.

In addition, optical component 130 has a columnar structure, and is light transmissive. Optical component 130 is, for example, a rod integrator, and includes a material such as fused quartz, plastic, etc.

It should be noted that optical component 130 is disposed inside casing 120, i.e., in space 123, at a distance from optical fiber 11, in view of the light input efficiency of laser beams that have exited through optical fiber 11. In addition, optical component 130 is disposed so as to block second end opening 125b of casing 120. In other words, casing 120 encloses the space between optical component 130 and optical fiber 11 so as to prevent dust, dirt, etc. from entering.

Luminaire 5

Luminaire 5 is used for converting wavelengths of laser beams from excitation light source 3 transmitted through optical fiber 11, to be emitted as illumination light. Luminaire 5 includes, for example, a stainless-steel fiber coupling, a stainless-steel ferrule, a glass lens, an aluminum holder, and an aluminum shell.

According to the present embodiment, as illustrated in FIG. 2 and FIG. 3, luminaire 5 includes phosphor layer 40, optical component 60, lens 70, heat sink 151, exterior portion 153, lens 155, and reflective component 157.

Phosphor Layer 40

Phosphor layer 40 converts the wavelength of light incident on one of the surfaces and emits the light through the one of the surfaces. More specifically, reflected light of the laser beam transmitted through optical fiber 11 is incident on the one of the surfaces of phosphor layer 40. According to the present embodiment, the intensity distribution of light incident on the one of the surfaces of phosphor layer 40 is sparse at a central region. Here, the intensity distribution of light incident on the one of the surfaces of phosphor layer 40 may be, for example, a substantially annular shape (i.e., a substantially ring shape). It should be noted that the intensity distribution that is sparse (i.e., a weak intensity or a zero intensity) at the central region can be rephrased as a portion with an intensity higher at a periphery region than at the central region. In addition, the light intensity distribution may be sparser toward the center of phosphor layer 40.

Phosphor layer 40 is formed in a plate-like shape, for example. Phosphor layer 40 contains phosphors that emit fluorescent light as a result of receiving laser light, and the phosphors are dispersed and held in a binder that is a transparent material including ceramic, silicone resin, or the like. The phosphor is, for example, an Yttrium Aluminum Garnet (YAG) phosphor, a BAM (Ba, Mg, Al) phosphor, or the like, and can be arbitrarily selected according to the type of a laser beam. It should be noted that the binder is not limited to ceramic or silicone resin, but other transparent materials such as transparent glass may also be used.

In the example illustrated in FIG. 2 and FIG. 3, phosphor layer 40 converts a wavelength of the laser beam that has exited through optical connector 20 and is incident on phosphor layer 40 via lens 70 and optical component 60, and emits wavelength-converted light whose wavelength has been converted. More specifically, phosphor layer 40 has a function of converting a wavelength of a portion of light incident on one of the surfaces adjacent to lens 155 illustrated in FIG. 2 and FIG. 3. According to the present embodiment, phosphor layer 40 emits, through one of the surfaces thereof adjacent to lens 155, wavelength-converted light resulting from a laser beam that has been incident on the one of the surfaces and whose wavelength has been converted.

It should be noted that the loss associated with wavelength conversion is converted into heat. Phosphor layer 40 has a temperature quenching property that the wavelength conversion efficiency decreases as the temperature increases, and thus heat dissipation of phosphor layer 40 is quite important. In the example illustrated in FIG. 2 and FIG. 3, phosphor layer 40 is supported by heat sink 151. More specifically, phosphor layer 40 is fixed to a second end surface of heat sink 151 at a position intersecting central axis O of heat sink 151 and is thermally connected to heat sink 151. In other words, in order to facilitate the dissipation of heat generated in phosphor layer 40, the other of the surfaces of phosphor layer 40 is in contact with the second end surface of heat sink 151. Here, central axis O is an axis passing through the center of luminaire 5 in the longitudinal direction when the luminaire has an elongated shape as in luminaire 5, as illustrated in FIG. 3. It should be noted that, although not illustrated in the diagram, a reflector plate may be disposed between phosphor layer 40 and heat sink 151.

In addition, phosphor layer 40 may include, for example, a red phosphor, a green phosphor, a blue phosphor, etc., and may emit fluorescent light such as red light, green light, blue light, etc., as a result of receiving laser light. In this case, the wavelength-converted light of these red light, green light, and blue light may be mixed to form white light.

When excitation light source 3 emits blue laser light, phosphor layer 40 includes a plurality of types of phosphors that absorb a portion of a blue laser beam and convert the wavelength to green to yellow. In addition, phosphor layer 40 may, for example, absorb a portion of the blue laser beam emitted from excitation light source 3 and emit pseudo white wavelength-converted light resulting from green to yellow fluorescent light being combined with a blue laser beam that is not absorbed by the phosphors and is emitted.

Heat Sink 151

Heat sink 151 is a heat dissipating component for dissipating heat generated in optical connector 20 and phosphor layer 40. Heat sink 151 holds phosphor layer 40 at a position displaced from second end face 131b of optical component 130. In addition, heat sink 151 holds lens 70 at a position corresponding to a second end of holder 150a which will be described later.

Heat sink 151 includes a plurality of fins, a plurality of holders 150a, and a plurality of engaging portions 159a, as illustrated in FIG. 2 and FIG. 3. It should be noted that heat sink 151 has two holders 150a in the example illustrated in FIG. 2 and FIG. 3, but the present disclosure is not limited to this example.

The plurality of holders 150a hold optical connectors 20. The plurality of holders 150a are each an insertion hole that holds optical connector 20 in a state in which optical connector 20 is inserted therein. Holder 150a fixes optical connector 20 in a predetermined orientation such that optical connector 20 faces lens 70. In the example illustrated in FIG. 2 and FIG. 3, the two optical connectors 20 are inserted to the two holders 150a in a one-to-one relationship to fix the two optical connectors 20. In addition, the two holders 150a are formed at locations away from central axis O of heat sink 151, which is indicated by the single-dot chain line.

Engaging portion 159a is provided in heat sink 151 and fixing member is inserted thereto to fix optical connector 20. Engaging portion 159a faces engaging portion 127 formed in casing 120 of optical connector 20 when optical connector 20 is attached to luminaire 5. Engaging portion 127 and engaging portion 159a are female screws.

Lens 70

Lens 70 is disposed on the optical path extending from optical connector 20 to phosphor layer 40 as illustrated in FIG. 2 and FIG. 3. According to the present embodiment, lens 70 is disposed in luminaire 5 at a position corresponding to the second end of holder 150a, so as to face second end face 131b of optical component 130.

Lens 70 is a convex lens with one of the surfaces protruding in a direction opposite to a travelling direction of a laser beam. It is sufficient if lens 70 can cause a laser beam to enter phosphor layer 40 via optical component 60, and thus lens 70 may be a concave lens.

It should be noted that, unless otherwise stated, the optical path according to the present embodiment includes not only the optical path through which the laser beam emitted by laser element 83 is transmitted to phosphor layer 40, but also the optical path through which the wavelength-converted light resulting from wavelength conversion by phosphor layer 40 travels before exiting illuminating device 1 through lens 155.

Exterior Portion 153

Exterior portion 153 is connected to heat sink 151, and disposed downstream of the optical path. Exterior portion 153 is a tubular body with openings that are open in front and behind the optical path.

Reflective Component 157

Reflective component 157 reflects the wavelength-converted light that has emitted from phosphor layer 40, toward lens 155. Reflective component 157 is a bowl-shaped component having a diameter that increases from phosphor layer 40 toward lens 155. Reflective component 157 is fixed to the second end surface of heat sink 151 to surround the periphery of phosphor layer 40, and faces lens 155.

It should be noted that reflective component 157 is provided with a slit for transmitting laser beams so as to avoid blocking laser beams reflected by optical component 60. When laser beams are not blocked as a result of positioning of optical component 60 and beam spot adjustment by lens 70, reflective component 157 need not be provided with the slit.

Optical Component 60

As illustrated in FIG. 2 and FIG. 3, each of the plurality of optical components 60 is fixed to exterior portion 153. Optical component 60 causes reflected light of the laser beam transmitted through optical fiber 11 to be incident on one of the surfaces of phosphor layer 40. In the example illustrated in FIG. 2 and FIG. 3, optical component 60 is fixed to exterior portion 153 in an orientation in which optical component 60 reflects laser beams that have exited through optical connector 20 and have been condensed by lens 70, toward the one of the surfaces of phosphor layer 40.

According to the present embodiment, optical component 60 is a mirror, and at least two optical components 60 are provided to luminaire 5. In other words, at least two optical components 60 reflect laser beams that have been transmitted respectively through at least two optical fibers 11, and reflected light of each of the laser beams is incident on one of the surfaces of phosphor layer 40 without overlapping at the center of the one of the surfaces.

Figure 4:
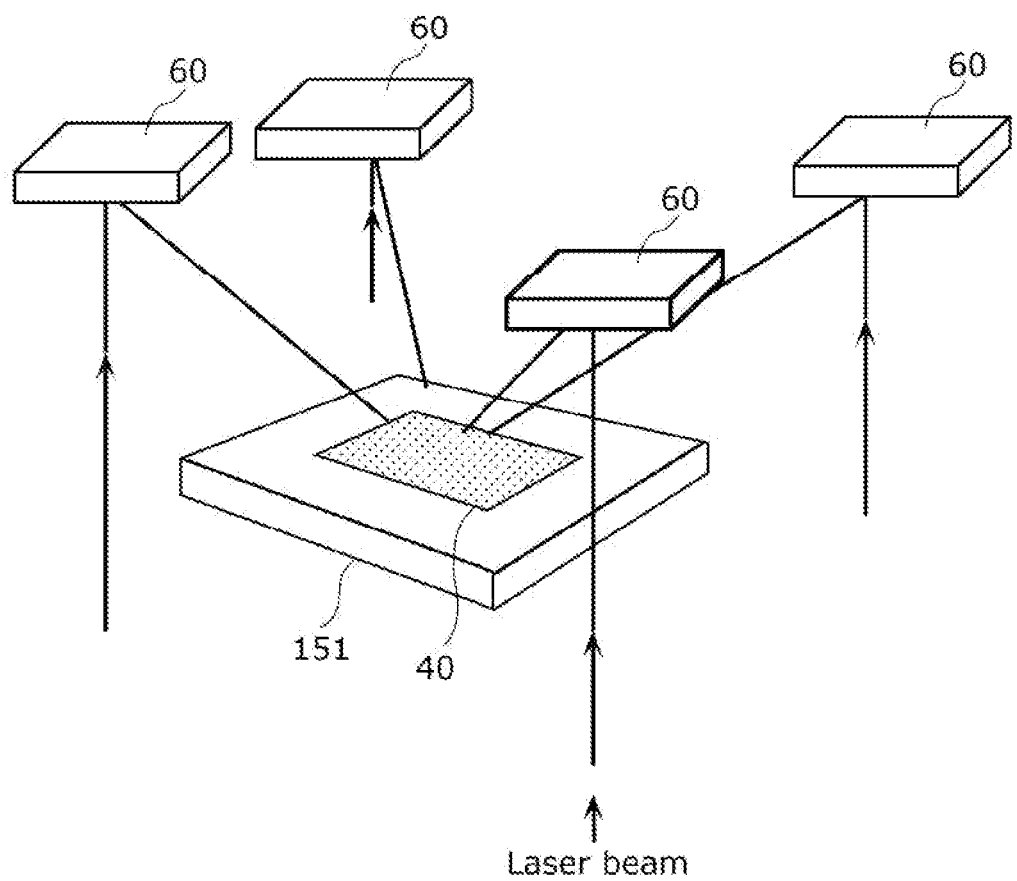
FIG. 4 is a schematic diagram illustrating the arrangement example of optical components and a phosphor layer according to Embodiment 1.
Figure 5:
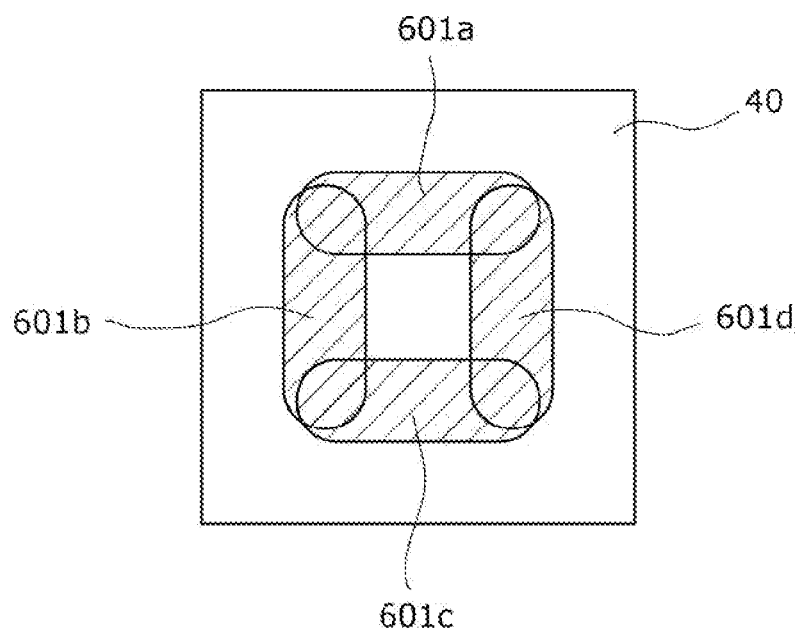
FIG. 5 is a schematic diagram illustrating the example of laser beams condensed on the phosphor layer according to the arrangement of the optical components illustrated in FIG. 4.
Figure 6:
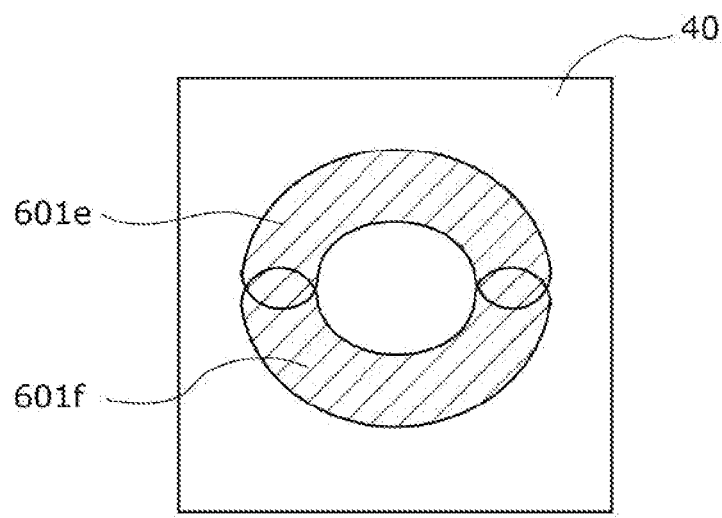
FIG. 6 is a schematic diagram illustrating the example of laser beams condensed on the phosphor layer by two optical components according to Embodiment 1.

FIG. 4 is a schematic diagram illustrating the arrangement example of optical components 60 and phosphor layer 40 according to Embodiment 1. FIG. 5 is a schematic diagram illustrating the example of laser beams condensed on phosphor layer 40 according to the arrangement of optical components 60 illustrated in FIG. 4. FIG. 6 is a schematic diagram illustrating the example of laser beams condensed on phosphor layer 40 by two optical components 60 according to Embodiment 1. The elements equivalent to those illustrated in FIG. 2 and FIG. 3 are assigned with the same reference signs, and detailed descriptions will be omitted.

In the example illustrated in FIG. 4, four optical components 60 are arranged. In this case, the orientation of each of the four optical components 60 is appropriately adjusted, thereby allowing the four optical components 60 to cause reflected light of the four laser beams that have been incident thereon to be incident on one of the surfaces of phosphor layer 40 at the positions respectively forming the sides of a square, without overlapping at the center of the one of the surfaces of phosphor layer 40. More specifically, as illustrated in FIG. 5, for example, the four optical components 60 cause reflected light beams 601a, 601b, 601c, and 601d that are reflected light of incident laser beams to be incident on one of the surfaces of phosphor layer 40 to form a top side, a left side, a bottom side, and a right side of a square. In this manner, it is possible to cause the intensity distribution of light beams incident on one of the surfaces of phosphor layer 40 to be sparse at the central region, in a form such as a substantially annular shape (i.e., a substantially ring shape). It should be noted that the intensity distribution may be sparser toward the center of phosphor layer 40.

It should be noted that the total number of optical components 60 may be two. In this case, the orientation of each of the two optical components 60 is appropriately adjusted, thereby allowing the two optical components 60 to cause reflected light of the laser beams to be incident on one of the surfaces of phosphor layer 40 to form a substantially annular shape. More specifically, as illustrated in FIG. 6, for example, the two optical components 60 cause reflected light beams 601e and 601f that are reflected light of the laser beams that have been incident thereon to be incident on one of the surfaces of phosphor layer 40 to form an upper semi-circular ark and a lower semi-circular ark. In this manner, it is possible to cause the intensity distribution of light beams incident on one of the surfaces of phosphor layer 40 to be a substantially annular shape (i.e., a substantially ring shape).

Lens 155

Lens 155 is a Fresnel lens, for example. Lens 155 is fixed to exterior portion 153 to block the opening of exterior portion 153. More specifically, lens 155 is fixed to exterior portion 153 in an orientation to face phosphor layer 40, and wavelength-converted light emitted from phosphor layer 40 enters lens 155. Then, lens 155 performs, on the wavelength-converted light, light distribution control to perform a predetermined illumination, and emits the light.

Advantageous Effects, Etc.

As described above, illuminating device 1 according to the present embodiment includes laser element 83 that emits a laser beam; optical fiber 11 that transmits the laser beam emitted by laser element 83; phosphor layer 40 that converts a wavelength of light incident on one of surfaces and emits the light through the one of the surfaces; and optical component 60 that causes reflected light of the laser beam transmitted through optical fiber 11 to be incident on the one of the surfaces of phosphor layer 40. With illuminating device 1 according to the present embodiment, an intensity distribution of the light incident on the one of the surfaces of phosphor layer 40 is sparse at a central region. In addition, the intensity distribution may be sparser toward a center of phosphor layer 40. Here, optical component 60 comprises at least two optical components 60 which are mirrors, laser element 83 comprises at least two laser elements 83, and optical fiber 11 comprises a least two optical fibers 11. The at least two optical fibers 11 transmit laser beams emitted by corresponding one of laser elements 83 of the at least two laser elements 83, the at least two mirrors reflect the laser beams that have been transmitted respectively through the at least two optical fibers 11, and reflected laser beams are respectively incident on one of the surfaces of phosphor layer 40 without overlapping at the center of the one of the surfaces.

According to this configuration, on one of the surfaces of phosphor layer 40, it is possible to inhibit laser beams from condensing at the center of phosphor layer 40 that is the center position of reflection of laser beams. In other words, the intensity distribution of laser beams that are incident on phosphor layer 40 is averaged, and thus luminance saturation of phosphor layer 40 and an increase in the temperature of phosphor layer 40 are inhibited. As a result, it is possible to avoid degradation of phosphor layer 40. In addition, since the luminance saturation of phosphor layer 40 is inhibited, it is possible to increase the energy density of laser beams that are incident on phosphor layer 40. As a result, the light intensity of reflected light can be increased to increase the luminance level, i.e., to increase the output. In other words, with illuminating device 1 according to the present embodiment, it is possible to inhibit an increase in the temperature of phosphor layer 40 while increasing the output.

Furthermore, the light source that emits laser beams need not be a line light source, and may be a point light source. Accordingly, since the shape of the light source is not restricted, it is possible to reduce the size of illuminating device 1.

In addition, the intensity distribution of laser beams that are incident on phosphor layer 40 is sparse at the central region in a form such as a substantially annular shape, and thus the energy density at the central region of one of the surfaces of phosphor layer 40 is small. As a result, it is easy to introduce a fail-safe mechanism that uses diffusion processing, or the like. In other words, illuminating device 1 according to the present embodiment can also support the laser beam intensity having no damage to the eyes, i.e., eye-safe.

In addition, in illuminating device 1 according to the present embodiment, casing 120 of optical connector 20 houses optical component 130 to inhibit dust, dirt, etc. from being attached to optical fiber 11 and optical component 130. According to this configuration, when a laser beam emitted through optical fiber 11 enters optical component 130, it is possible to inhibit heat generation in optical fiber 11 and optical component 130 due to dust, dirt, etc. being attached to optical fiber 11 and optical component 130.

In addition, optical connector 20 does not emit a laser beam to the outside, except the inside of casing 120. According to this configuration, even when optical connector 20 is unexpectedly detached from luminaire 5, it is possible to inhibit damage to the human body due to the leakage of a laser beam.

[Variation 1]

Embodiment 1 has described that lens 70 is disposed between optical component 130 and optical connector 20 on the optical path extending from optical connector 20 to phosphor layer 40 as illustrated in FIG. 3, for example. However, the present disclosure is not limited to this configuration. Lens 70 may be disposed between optical component 60 that is a mirror and phosphor layer 40.

Figure 7:
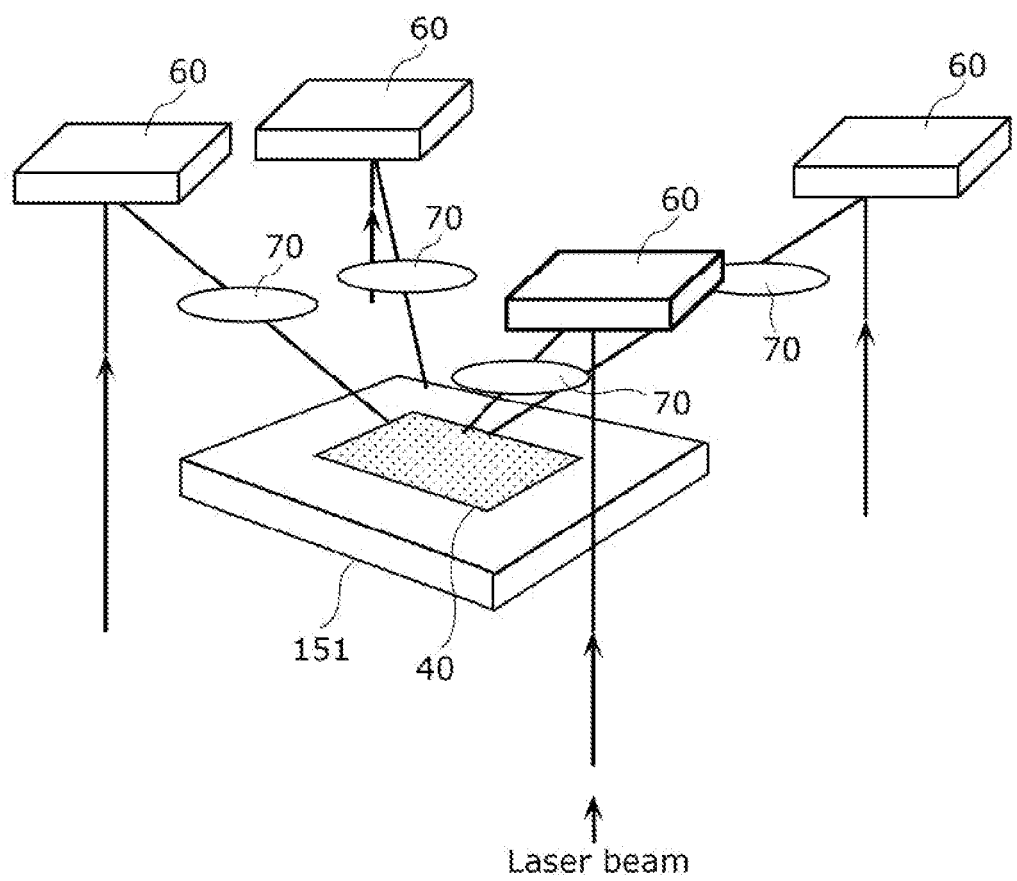
FIG. 7 is a schematic diagram illustrating the arrangement example of optical components and a phosphor layer according to Variation 1 of Embodiment 1.

FIG. 7 is a schematic diagram illustrating the arrangement example of optical components 60 and phosphor layer 40 according to Variation 1 of Embodiment 1. The elements equivalent to those illustrated in FIG. 4 are assigned with the same reference signs, and detailed descriptions will be omitted.

According to the present variation, lenses 70 are disposed between phosphor layer 40 and optical components 60 that are mirrors. In this case as well, the orientation of each of the four optical components 60 and the orientation of each of the four lenses 70 are appropriately adjusted, thereby allowing the four optical components 60 to cause four light beams that are reflected light of the laser beams to be incident on one of the surfaces of phosphor layer 40 without overlapping at the center.

Accordingly, with illuminating device 1 according to the present variation, the intensity distribution of laser beams that are incident on phosphor layer 40 is averaged, and luminance saturation of phosphor layer 40 is inhibited. As a result, it is possible to increase the output while inhibiting an increase in the temperature of phosphor layer 40.

[Variation 2]

Embodiment 1 and Variation 1 of Embodiment 1 have descried that luminaire 5 is proved with lenses 70. However, the present disclosure is not limited to this configuration. Luminaire 5 may be implemented without including lenses 70 when the optical components included in luminaire 5 are not optical components 60 that are mirrors but optical components 60A that are reflective diffraction gratings such as Fresnel lenses. The following describes luminaire 5A that is not provided with lenses 70, with reference to the drawings.

Configuration

Figure 8A:
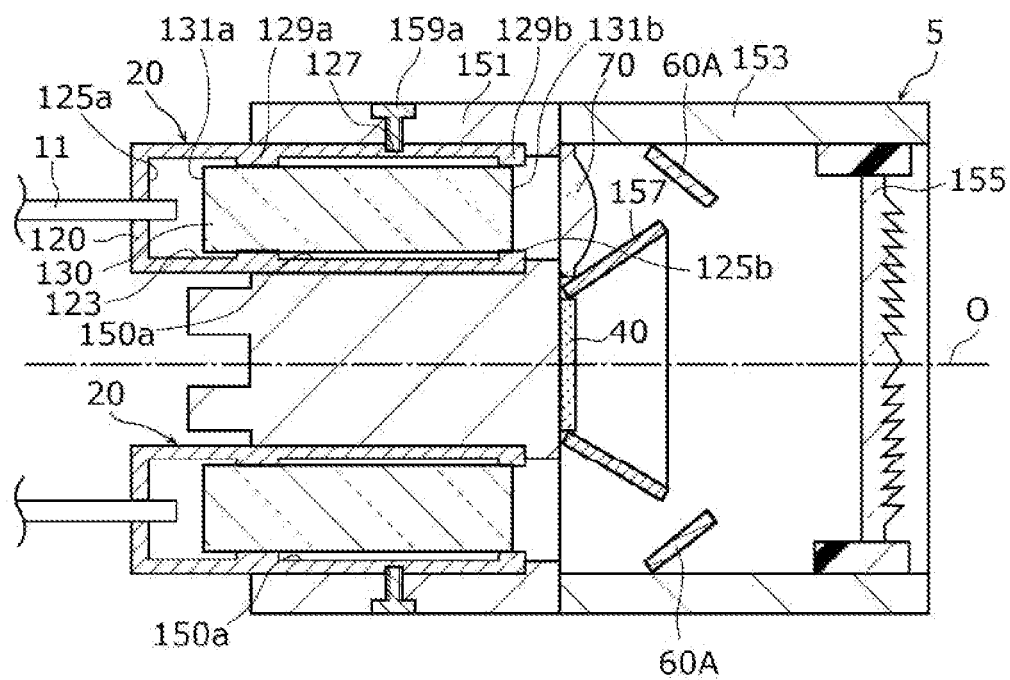
FIG. 8A is a partially enlarged cross-sectional diagram illustrating an illuminating device according to Variation 2 of Embodiment 1.
Figure 8B:
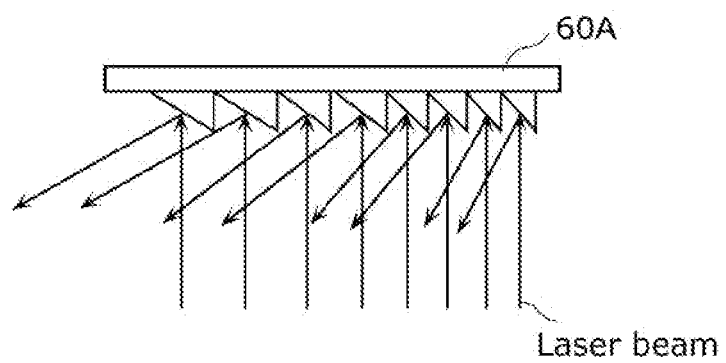
FIG. 8B is a cross-sectional diagram illustrating optical components according to Variation 2 of Embodiment 1.

FIG. 8A is a partially enlarged cross-sectional diagram illustrating illuminating device 1 according to Variation 2 of Embodiment 1. FIG. 8B is a cross-sectional diagram illustrating optical components 60A according to Variation 2 of Embodiment 1. It should be noted that the elements equivalent to those illustrated in FIG. 3 and FIG. 4 are assigned with the same reference signs, and detailed descriptions will be omitted.

Luminaire 5 illustrated in FIG. 8A has a configuration different from the configuration of luminaire 5 illustrated in FIG. 3, in that luminaire 5 is not provided with lens 70 and includes optical components 60A that are reflective diffraction gratings, instead of optical components 60 that are mirrors. In other words, optical components 60A are each a reflective diffraction grating including, for example, a Fresnel lens illustrated in FIG. 8B. Optical component 60A reflects laser beams transmitted through optical fiber 11, and causes reflected laser beams to be incident on one of the surfaces of phosphor layer 40 without overlapping at the center of the one of the surfaces of phosphor layer 40.

It should be noted that, although a plurality of optical components 60A are included in luminaire 5A in the example illustrated in FIG. 8A, it is sufficient if at least one optical component 60A is included in luminaire 5A. With at least one optical component 60A, it is possible to cause reflected light to be incident on one of the surfaces of phosphor layer 40 without overlapping at the center of the one of the surfaces of phosphor layer 40, by adjusting the arrangement and shape of a plurality of lenses included in optical component 60A and the orientation of optical component 60A.

Figure 9A:
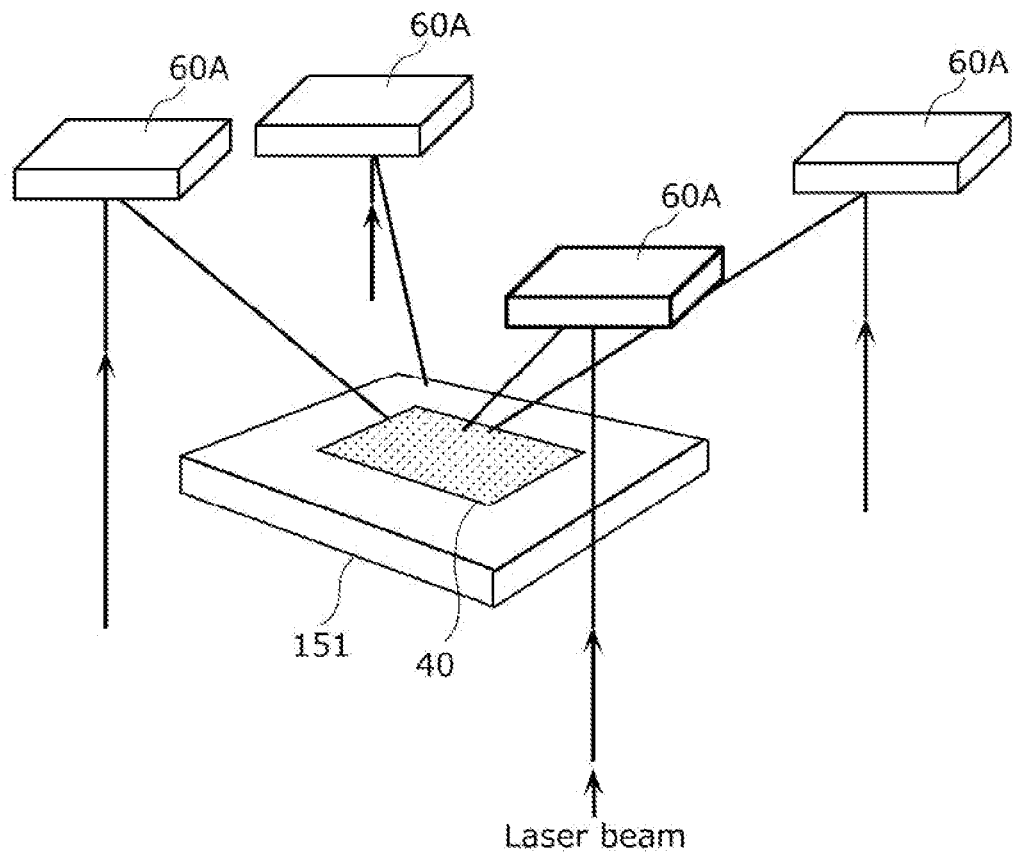
FIG. 9A is a schematic diagram illustrating the arrangement example of the optical components and a phosphor layer according to Variation 2 of Embodiment 1.
Figure 9B:
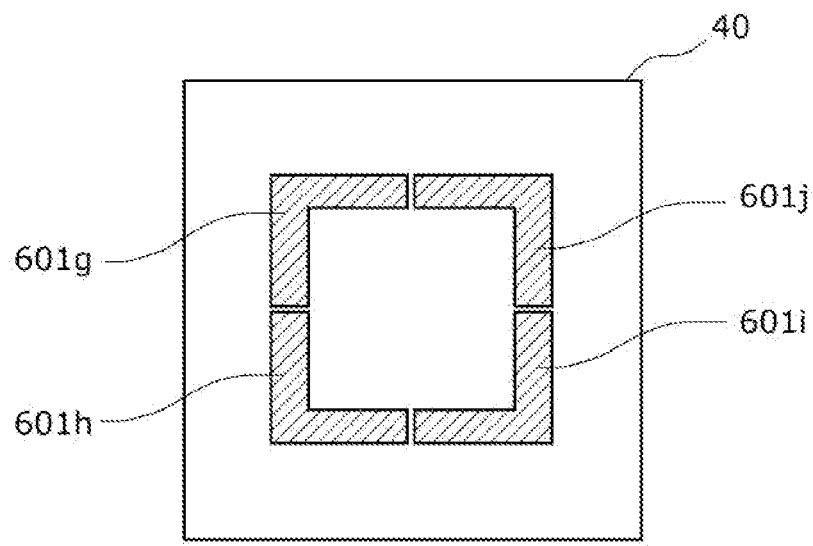
FIG. 9B is a schematic diagram illustrating the example of laser beams condensed on the phosphor layer according to the arrangement of the optical components illustrated in FIG. 9A.

FIG. 9A is a schematic diagram illustrating the arrangement example of optical components 60A and phosphor layer 40 according to Variation 2 of Embodiment 1. FIG. 9B is a schematic diagram illustrating the example of laser beams condensed on phosphor layer 40 according to the arrangement of optical components 60A illustrated in FIG. 9A.

In the example illustrated in FIG. 9A, four optical components 60A are arranged. Here, the arrangement and shape of the plurality of lenses included in four optical components 60A and the orientation of optical component 60A are appropriately adjusted. In this case, the four optical components 60A are capable of causing four light beams that are reflected light of the laser beams that have been incident thereon to be incident on one of the surfaces of phosphor layer 40 without overlapping at the center of the one of the surfaces of phosphor layer 40.

Here, the four optical components 60A may cause four light beams that are reflected light of the laser beams to be incident on one of the surfaces of phosphor layer 40 without overlapping at all, to be distributed in a substantially annular shape, as illustrated in FIG. 9B. More specifically, the four optical components 60A may cause light beams 601g, 601h, 601i, and 601j that are reflected light of the laser beams to be incident without overlapping at all, to be distributed in a substantially quadrilateral annular shape at the positions of an upper left, a lower left, an upper right, and a lower right in an L-shape. In other words, the plurality of optical components 60A according to the present variation may cause the reflected light beams to be incident on one of the surfaces of phosphor layer 40 in a substantially annular arrangement without overlapping at all on the one of the surfaces of phosphor layer 40.

Advantageous Effects, Etc.

As described above, illuminating device 1 according to the present variation includes laser element 83 that emits a laser beam; optical fiber 11 that transmits the laser beam emitted by laser element 83; phosphor layer 40 that converts a wavelength of light incident on one of surfaces and emits the light through the one of the surfaces; and optical component 60A that causes reflected light of the laser beam transmitted through optical fiber 11 to be incident on the one of the surfaces of phosphor layer 40. With illuminating device 1 according to the present variation, an intensity distribution of the light incident on the one of the surfaces of phosphor layer 40 is sparse at a central region. In addition, the intensity distribution may be sparser toward a center of phosphor layer 40. Here, optical component 60A is a reflective diffraction grating, and the reflective diffraction grating causes the laser beam transmitted through optical fiber 11 to be reflected, and causes reflected light of the laser beam to be incident on the one of the surfaces of phosphor layer 40 without overlapping at a center of the one of the surfaces.

As described above, as compared with Embodiment 1 and Variation 1, use of optical component 60A which is a reflective diffraction grating eliminates the necessity of including lens 70 in illuminating device 1 of the present variation. Accordingly, it is possible to save the troubles of appropriately adjusting the orientations of the plurality of mirrors and the orientations of the plurality of lenses 70. In other words, with illuminating device 1 according to the present variation, it is possible to implement the intensity distribution that is sparse at the central region; that is, an intensity distribution having a substantially annular shape, by only adjusting the orientation of the reflective diffraction grating, etc.

As described above, with illuminating device 1 according to the present variation, the intensity distribution of laser beams that are incident on phosphor layer 40 is averaged, and the luminance saturation of phosphor layer 40 is inhibited. As a result, in addition to inhibiting an increase in the temperature of phosphor layer 40 and avoiding degradation, it is possible to increase an output by increasing the energy density of laser beams. Furthermore, since there is no restriction on the shape of the light source that emits laser beams, it is possible to reduce the size of illuminating device 1.

In addition, the intensity distribution of laser beams that are incident on phosphor layer 40 may be, for example, sparse at the central region in a form such as a substantially annular shape, and may further be sparser toward the center of phosphor layer 40. According to this configuration, the energy density is small at the central region of one of the surfaces of phosphor layer 40, and thus a fail-safe mechanism that uses diffusion processing or the like can be easily introduced. In other words, illuminating device 1 according to the present variation can support the laser beam intensity having no damage to the eyes, i.e., eye-safe.

In addition, when illuminating device 1 according to the present variation includes at least two optical components 60A, optical components 60A may cause the respective reflected light to be incident on one of the surfaces of phosphor layer 40 in a substantially annular arrangement without overlapping at all on the one of the surfaces of phosphor layer 40. According to this configuration, it is possible to eliminate the overlap of illumination regions that are illuminated with laser beams on the one of the surfaces of phosphor layer 40. As a result, it is possible to further inhibit degradation of phosphor layer 40, allowing further inhibiting a decrease in conversion efficiency.

Embodiment 2

Embodiment 1 has described that the intensity distribution of laser beams that are incident on phosphor layer 40 is made sparse at the central region of phosphor layer 40 in a form such as a substantially annular shape, by using optical components 60 and 60A that reflect laser beams so as to be incident on phosphor layer 40. However, the present disclosure is not limited to this configuration. The intensity distribution of laser beams that are incident on phosphor layer 40 may be made sparse at the central region by using the configurations of excitation light source 3 and optical fiber 11. Hereinafter, for the sake of simplifying the description, a diagram schematically illustrating the configuration including a set of laser elements 83 included in excitation light source 3, a single lens 87, and a single optical fiber 11 is used for the description.

Configuration

Figure 10:
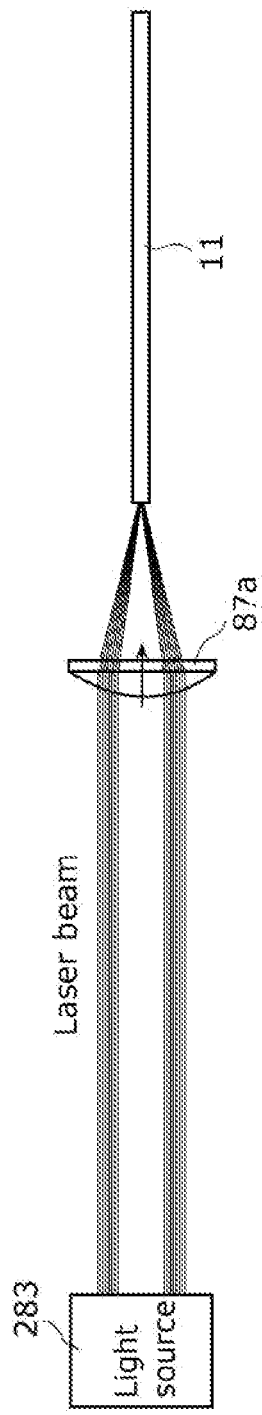
FIG. 10 is a schematic diagram illustrating the arrangement example of a light source, a lens, and an optical fiber according to Embodiment 2.
Figure 11A:
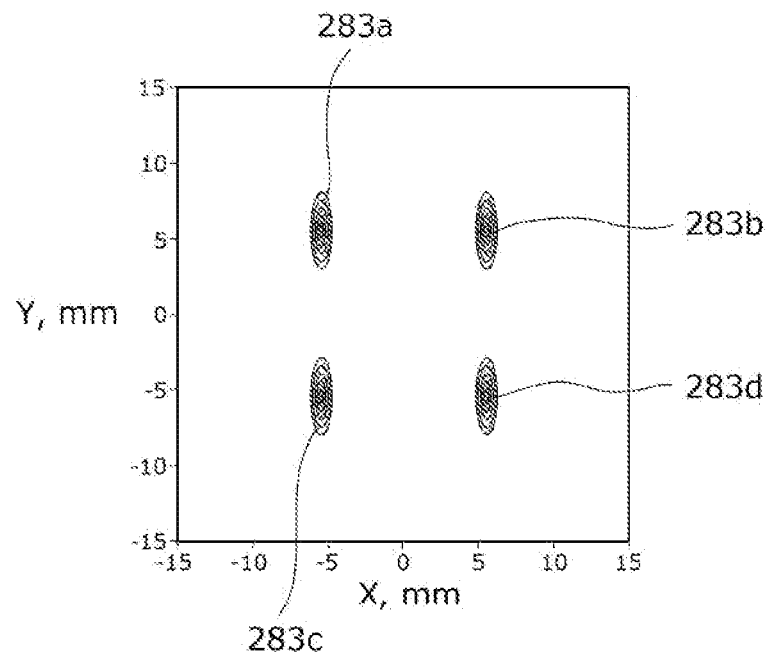
FIG. 11A is a schematic diagram illustrating a light intensity distribution of laser beams emitted by the light source according to Embodiment 2.
Figure 11B:
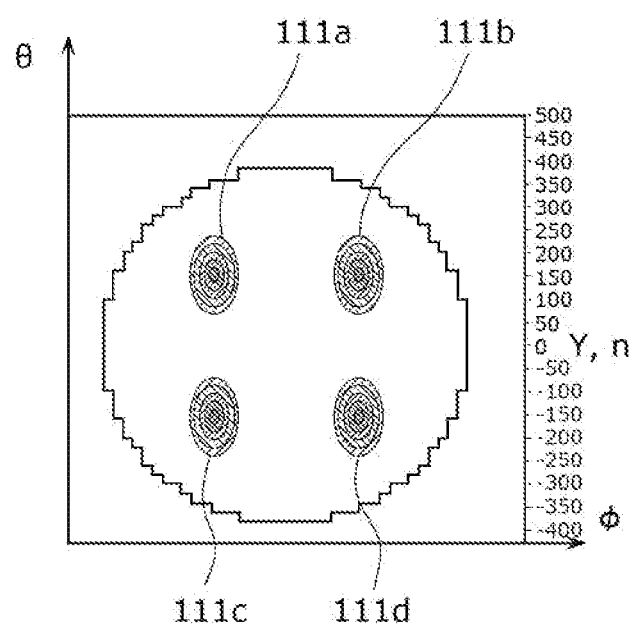
FIG. 11B is a schematic diagram illustrating an angle distribution of laser beams incident on the optical fiber according to Embodiment 2.
Figure 11C:
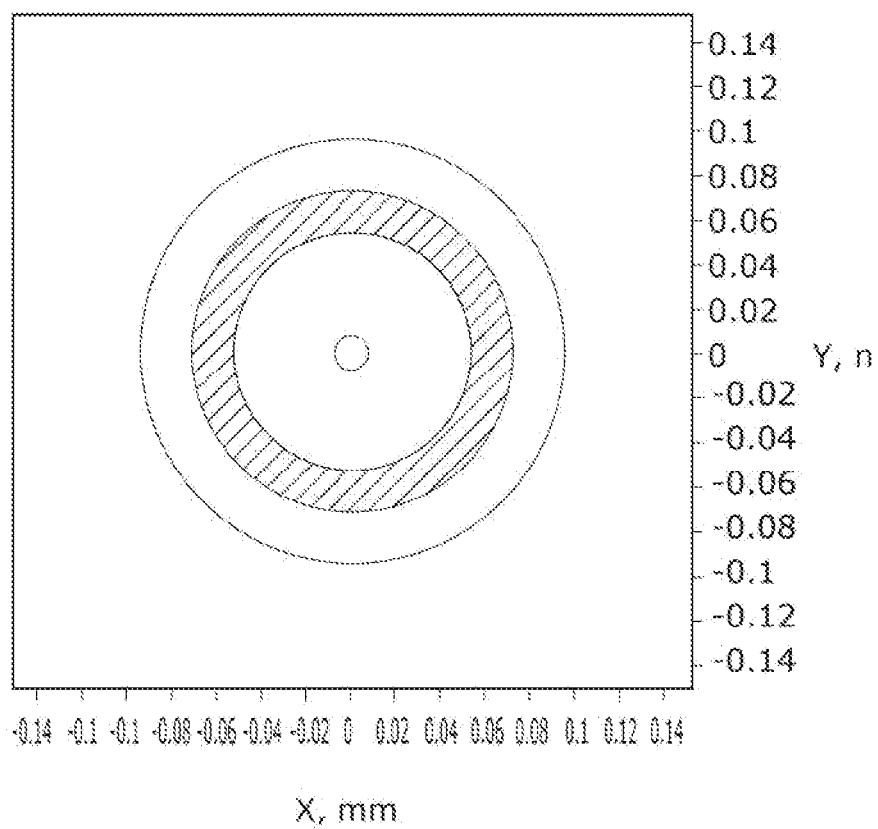
FIG. 11C is a schematic diagram illustrating a light intensity distribution of laser beams emitted through the optical fiber according to Embodiment 2.
Figure 12:
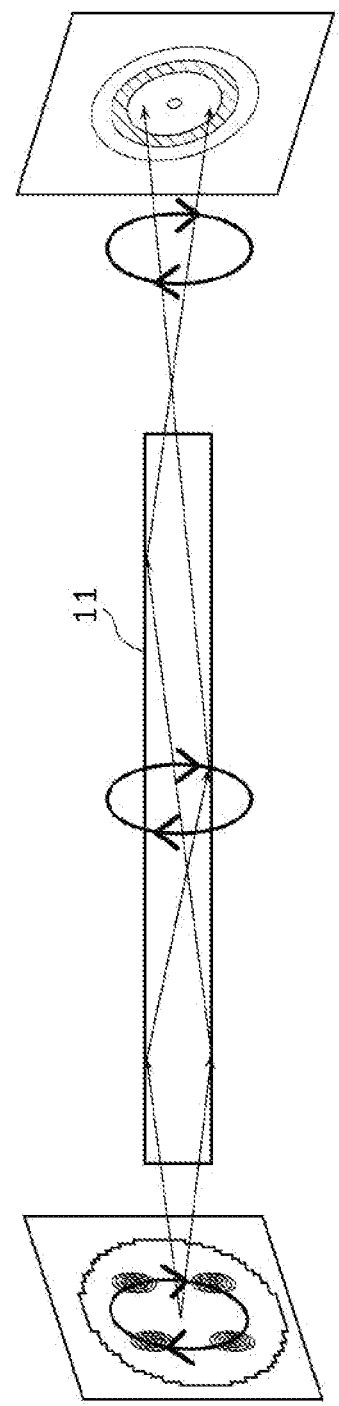
FIG. 12 is a schematic diagram illustrating that the angle distribution of light at the time of entrance is conserved in the optical fiber according to Embodiment 2.

FIG. 10 is a schematic diagram illustrating the arrangement example of light source 283, lens 87a, and optical fiber 11 according to Embodiment 2. FIG. 11A is a schematic diagram illustrating a light intensity distribution of laser beams emitted by light source 283 according to Embodiment 2. FIG. 11B is a schematic diagram illustrating an angle distribution of laser beams incident on optical fiber 11 according to Embodiment 2. FIG. 11C is a schematic diagram illustrating a light intensity distribution of laser beams emitted through optical fiber 11 according to Embodiment 2. FIG. 12 is a schematic diagram illustrating that the angle distribution of light at the time of entrance is maintained in optical fiber 11 according to Embodiment 2.

Light Source 283

Light source 283 includes a set of laser elements 83 that comprises at least two laser elements 83. Light source 283 emits at least two laser beams. According to the present embodiment, the set of laser elements 83 comprises four laser elements 83 arranged in a matrix with a pitch of 11 mm. In this case, the four laser elements 83 emit laser beams 283a, 283b, 283c, and 283d arranged in a matrix with a pitch of 11 mm, as illustrated in FIG. 11A, for example. Here, a beam divergence angle of each of the four laser elements 83 is approximately 0 to 1 degrees.

Lens 87a

Lens 87a is disposed between optical fiber 11 and the at least two laser elements 83. The at least two laser beams emitted by light source 283 are respectively incident on lens 87a perpendicularly to lens 87a at positions other than the center of lens 87a. Lens 87a causes the at least two laser beams that have been incident thereon to obliquely enter optical fiber 11 within the angular range of the numerical aperture of optical fiber 11.

According to the present embodiment, as illustrated in FIG. 10, lens 87a is located between optical fiber 11 and light source 283. The four laser beams emitted from light source 283 are incident on lens 87a to avoid the center of lens 87a. Lens 87a condenses laser beams using a lens effective diameter to the extent that light does not leak, and causes the condensed laser beams to obliquely enter optical fiber 11. Here, to obliquely enter means that the laser beams are incident from a direction at an angle within the numerical aperture (NA) with respect to the fiber axis of optical fiber 11.

It should be noted that lens 87a is a convex lens as described above. Lens 87a may be composed of an aspheric lens to inhibit blur caused by aberration. In the example illustrated in FIG. 10, focal length f of lens 87a is 37.5 mm, but is not limited to this example.

It is sufficient if lens 87a is capable of causing laser beams to obliquely enter optical fiber 11 within the angular range of the numerical aperture of optical fiber 11. Accordingly, optimal lens 87a may be designed using the law of Etendue. More specifically, according to the law of Etendue, the product of the minimum beam spot diameter collected by the lens and the divergence angle ($NA^2$) is conserved. It is thus possible to design optimal lens 87a based on the etendue of the laser beam, i.e., the beam spot diameter and divergence angle of the laser beam, and the value of the numerical aperture (NA) and the aperture diameter (φ) of optical fiber 11.

It should be noted that, according to the law of Etendue, a lens with a short focal length can produce a smaller image but has a larger divergence angle. On the other hand, a lens with a longer focal length can produce a larger image, but the divergence angle is smaller. Accordingly, when designing lens 87a using a lens with a long focal length, although it is easy to make lens 87a within the numerical aperture (NA) of optical fiber 11, it is necessary to increase the aperture diameter.

Optical Fiber 11

Optical fiber 11 transmits a plurality of laser beams emitted by light source 283. According to the present embodiment, as illustrated in FIG. 10, optical fiber 11 is disposed on the axis of lens 87a. The four laser beams condensed by lens 87a obliquely enter optical fiber 11 within the angular range of the numerical aperture of optical fiber 11. It should be noted that, in the example illustrated in FIG. 10, the numerical aperture (NA) of optical fiber 11 is 0.22, and the lens diameter φ is 0.6 mm.

Here, for example, as illustrated in FIG. 11B, the angular distributions of the four laser beams 111a, 111b, 111c, 111d that are caused to enter optical fiber 11 by lens 87a are included in a circular region. It should be noted that, if the angular distribution of the four laser beams 111a, 111b, 111c, 111d caused to enter optical fiber 11 is outside the circular region, the four laser beams 111a, 111b, 111c, 111d exceed the numerical aperture (NA) of optical fiber 11. This case deviates the conditions for the total reflection of optical fiber 11, resulting in transmission loss.

In addition, the intensity distribution of the laser beams emitted by optical fiber 11 has a substantially annular shape; that is, is sparse at the central region as illustrated in FIG. 11C. This is because, as illustrated in FIG. 12, optical fiber 11 is configured in a cylindrical shape, i.e., axisymmetric, and thus the angular distribution at the time of entrance of a laser beam; that is, the angular distribution of the original laser beam is conserved no matter how many times the laser beam is reflected inside optical fiber 11.

It should be noted that, with illuminating device 1 according to the present embodiment, the laser beam transmitted through optical fiber 11 also enters phosphor layer 40 through optical connector 20, lens 70, and optical component 60. In optical connector 20, the laser beam transmitted through optical fiber 11 passes through optical component 130 which is a rod integrator. Since the rod integrator is also configured in a cylindrical shape, i.e., axisymmetric, the angular distribution of the laser beam transmitted through optical fiber 11 is conserved. As a result, even when optical component 60 is not adjusted as described in Embodiment 1, a laser beam with an intensity distribution having a substantially annular shape is incident on phosphor layer 40. Of course, when optical component 60 is adjusted as described in Embodiment 1, a laser beam with an intensity distribution having a substantially annular shape is incident on phosphor layer 40.

Advantageous Effects, Etc.

As described above, illuminating device 1 according to the present embodiment includes laser element 83 that emits a laser beam; optical fiber 11 that transmits the laser beam emitted by laser element 83; phosphor layer 40 that converts a wavelength of light incident on one of surfaces and emits the light through the one of the surfaces; and optical component 60 that causes reflected light of the laser beam transmitted through optical fiber 11 to be incident on the one of the surfaces of phosphor layer 40. With illuminating device 1 according to the present variation, an intensity distribution of the light incident on the one of the surfaces of phosphor layer 40 is sparse at a central region. The light intensity distribution may have a substantially annular shape (substantially ring shape), or may further be sparser toward the center of phosphor layer 40. Here, laser element 83 comprises as least two laser elements 83, and illuminating device 1 according to the present embodiment further includes lens 87a disposed between optical fiber 11 and the at least two laser elements 83. The laser beams emitted respectively by the at least two laser elements 83 are incident on lens 87a perpendicularly to lens 87a at positions other than the center of lens 87a. Lens 87a causes the at least two laser beams that have been incident thereon to obliquely enter optical fiber 11 within the angular range of the numerical aperture of optical fiber 11.

Accordingly, the intensity distribution of laser beams that are incident on phosphor layer 40 is averaged, and luminance saturation of phosphor layer 40 is inhibited. As a result, it is possible to not only inhibit an increase in the temperature of phosphor layer 40 to avoid degradation, but also increase the output by increasing the energy density of the laser beams. Furthermore, since there is no restriction on the shape of the light source that emits laser beams, it is possible to reduce the size of illuminating device 1 according to the present embodiment.

In addition, the intensity distribution of laser beams that are incident on phosphor layer 40 is sparse at the central region of phosphor layer 40 in a form such as a substantially annular shape, and thus the energy density at the central region of one of the surfaces of phosphor layer 40 is small. As a result, it is easy to introduce a fail-safe mechanism that uses diffusion processing or the like. In other words, illuminating device 1 according to the present variation can also support the eye-safe.

[Variation 1]

Embodiment 2 has described that light source 283 includes four laser elements 83 arranged in matrix, but the arrangement of the four laser elements 83 is not limited to this example.

Figure 13A:
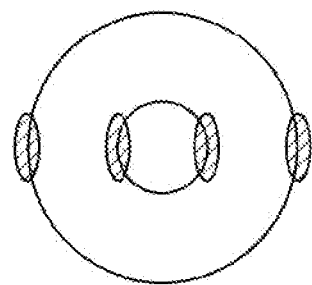
FIG. 13A is a schematic diagram illustrating a light intensity distribution of laser beams emitted by a light source according to Variation 1 of Embodiment 2.
Figure 13B:
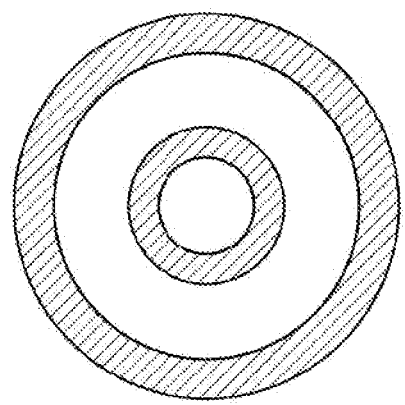
FIG. 13B is a schematic diagram illustrating a light intensity distribution of laser beams emitted through an optical fiber according to Variation 1 of Embodiment 2.

FIG. 13A is a schematic diagram illustrating a light intensity distribution of laser beams emitted by light source 283 according to Variation 1 of Embodiment 2. FIG. 13B is a schematic diagram illustrating a light intensity distribution of laser beams emitted through optical fiber 11 according to Variation 1 of Embodiment 2. In other words, light source 283 may include four laser elements 83 arranged in a line as illustrated in FIG. 13A. It is sufficient if the four laser elements 83 arranged in a line are line-symmetrically disposed at positions other than the center of lens 87a.

Accordingly, when light source 283 includes a plurality of laser elements 83 arranged in a line, it is sufficient if the laser beams emitted by light source 283, i.e., the plurality of laser elements 83 are line-symmetrically incident on lens 87a at positions other than the center of lens 87a.

According to this configuration, with illuminating device 1 according to the present variation, even when optical components 60 are not appropriately adjusted as described in Embodiment 1, laser beams are incident on phosphor layer 40 with an intensity distribution having a substantially annular shape with a double structure (double ring shape) as illustrated in FIG. 13B. In other words, laser beams are incident on phosphor layer 40 with an intensity distribution that is sparse (weak intensity or zero intensity) at the central region.

As described above, depending on how the four laser elements 83 are arranged, it is possible to form a substantially annular shape with a single structure (e.g., FIG. 11C) or a double ring shape (e.g., FIG. 13B) as an intensity distribution that is sparse (weak or zero intensity) at the central region of phosphor layer 40.

[Variation 2]

Embodiment 2 and Variation 1 of Embodiment 2 have described that light source 283 includes four laser elements 83. However, the present disclosure in not limited to this example, and light source 283 may include two laser elements 83.

Figure 14:
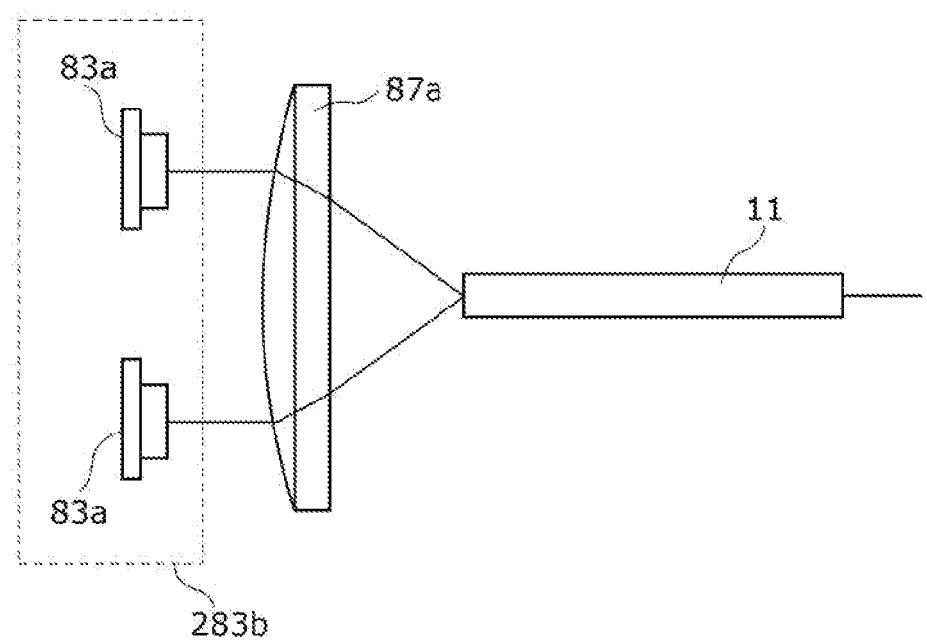
FIG. 14 is a schematic diagram illustrating the arrangement example of a light source, a lens, and an optical fiber according to Variation 2 of Embodiment 2.
Figure 15:
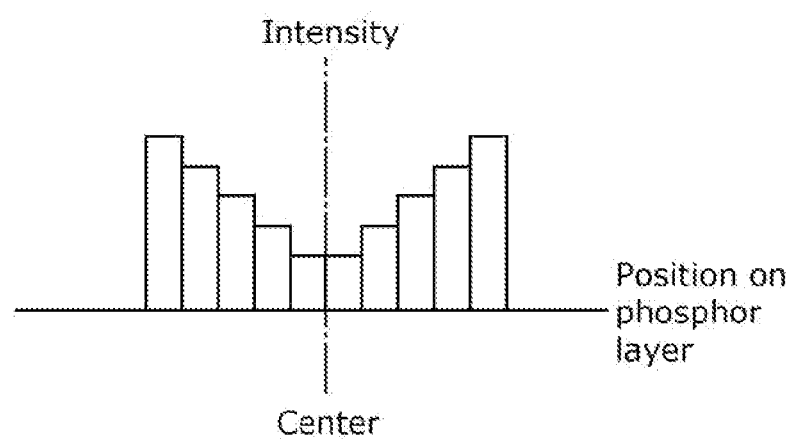
FIG. 15 is a schematic diagram illustrating the intensity distribution of laser beams that are incident on a phosphor layer according to Variation 2 of Embodiment 2.

FIG. 14 is a schematic diagram illustrating the arrangement example of light source 283b, lens 87a, and optical fiber 11 according to Variation 2 of Embodiment 2. FIG. 15 is a schematic diagram illustrating the intensity distribution of laser beams that are incident on phosphor layer 40 according to Variation 2 of Embodiment 2. It should be noted that the elements equivalent to those illustrated in FIG. 10 are assigned with the same reference signs, and detailed descriptions will be omitted.

Light source 283b includes a set of laser elements 83 that comprises two laser elements 83 as illustrated in FIG. 14. In this case, it is sufficient if the two laser elements 83 are arranged in a line. More specifically, it is sufficient if the two laser elements 83 arranged in a line are line-symmetrically disposed at positions other than the center of lens 87a. In other words, it is sufficient if the laser beams respectively emitted by light source 283b, i.e., the two laser elements 83 are line-symmetrically incident on lens 87a at positions other than the center of lens 87a.

According to this configuration, with illuminating device 1 according to the present variation, even if optical components 60 are not adjusted as described in Embodiment 1, laser beams are incident on phosphor layer 40 with an intensity distribution that is sparse (weak or zero intensity) at the central region of phosphor layer 40; that is, an intensity distribution having a substantially annular shape.

The comparison example will now be described.

Figure 16A:
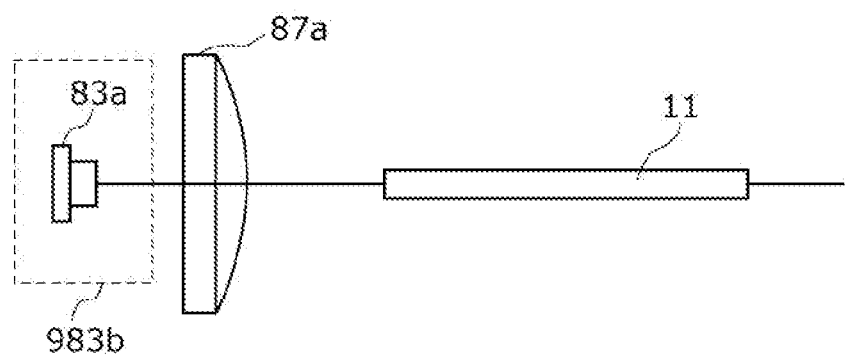
FIG. 16A is a schematic diagram illustrating the arrangement example of a light source, a lens, and an optical fiber according to a comparison example.
Figure 16B:
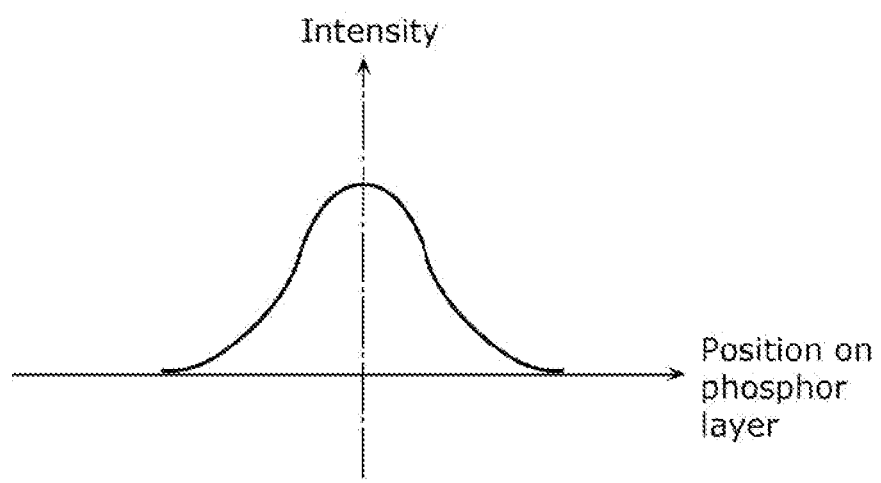
FIG. 16B is a schematic diagram illustrating the intensity distribution of laser beams that are incident on a phosphor layer according to the comparison example.

FIG. 16A is a schematic diagram illustrating the arrangement example of light source 983b, lens 87a, and optical fiber 11 according to the comparison example. FIG. 16B is a schematic diagram illustrating the intensity distribution of laser beams that are incident on phosphor layer 40 according to the comparison example. It should be noted that the elements equivalent to those illustrated in FIG. 14 are assigned with the same reference signs, and detailed descriptions will be omitted.

Light source 983b includes a set of laser elements 83a that comprises one laser element 83a as illustrated in FIG. 16A. In addition, the one laser element 83a is disposed at a position corresponding to the center of lens 87a. The laser beam emitted by light source 983b is guided to phosphor layer 40 of illuminating device 1 via optical fiber 11.

In this case, the laser beam is incident on phosphor layer 40 with a Gaussian distribution; that is, an intensity distribution that is denser (i.e., higher intensity) toward the center of phosphor layer 40, as illustrated in FIG. 16B.

Embodiment 3

Embodiment 1 has described that the intensity distribution of laser beams that are incident on phosphor layer 40 is made sparse at the central region of phosphor layer 40 in a form such as a substantially annular shape, by using, for example, the configuration of optical components 60 and 60A which reflect the laser beams so as to be incident on phosphor layer 40, and further that the intensity distribution of the laser beams is made sparser toward the center of phosphor layer 40. In addition, Embodiment 2 has described that the intensity distribution of laser beams that are incident on phosphor layer 40 is made sparse at the central region of phosphor layer 40 in a form such as a substantially annular shape, by using, for example, the arrangement of excitation light source 3 (i.e., at least two laser elements 83) and optical fiber 11, and further that the intensity distribution of the laser beams is made sparser toward the center of phosphor layer 40. However, the configuration for making the intensity distribution of the laser beams that are incident on phosphor layer 40 sparse at the central region in a form such as a substantially annular shape, and further the configuration for making the intensity distribution sparser toward the center of phosphor layer 40, are not limited to the above-described examples.

By processing the end-face of optical fiber 11 or the end-face of optical component 130 which is a rod integrator, the intensity distribution of the laser beams incident on phosphor layer 40 may be made sparse at the center in a form such as a substantially annular shape, and may further be made sparser toward the center of phosphor layer 40.

Hereinafter, a configuration of optical fiber 11C according to the present embodiment will be described. It should be noted that a description similar to the following description for optical fiber 11C is applied to optical component 130 that is a rod integrator, and thus the description for optical component 130 will be omitted.

Configuration, Etc.

Configuration of Optical Fiber 11C

Optical fiber 11C is processed such that the center of the end face on the side opposite to one side close to a laser element has a recess structure that is recessed. A laser beam directly enters optical fiber 11C through the end face of the one side of optical fiber 11C. Here, the end face on the opposite side is processed such that the end face is increasingly recessed toward the center.

FIG. 17 is a schematic cross-sectional view illustrating optical fiber 11C according to Embodiment 3. FIG. 17 shows an example in which one laser element 83a is disposed as a light source. More specifically, illustration of lens 87 is omitted in FIG. 17, and FIG. 17 schematically shows that a laser beam emitted by the one laser element 83a enters optical fiber 11C along a fiber axis of optical fiber 11C.

In optical fiber 11C, as illustrated in FIG. 17, end face 112C on the side opposite to the one side close to laser element 83a is processed such that end face 112C has a recess structure in which the center is recessed, for example, like a circular cone, in other words, the end face is increasingly recessed toward the center.

Profile of Optical Fiber 11C

Next, the profile of optical fiber 11C, i.e., the light intensity distribution indicated by the laser beam that enters optical fiber 11C and is transmitted and emitted through optical fiber 11C will be described.

Figure 18A:
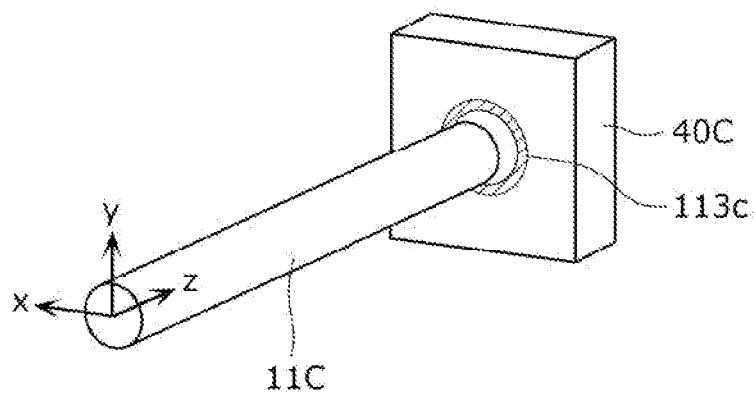
FIG. 18A is a schematic view illustrating how a laser beam transmitted through the optical fiber according to Embodiment 3 is incident on phosphor layer 40C.
Figure 18B:
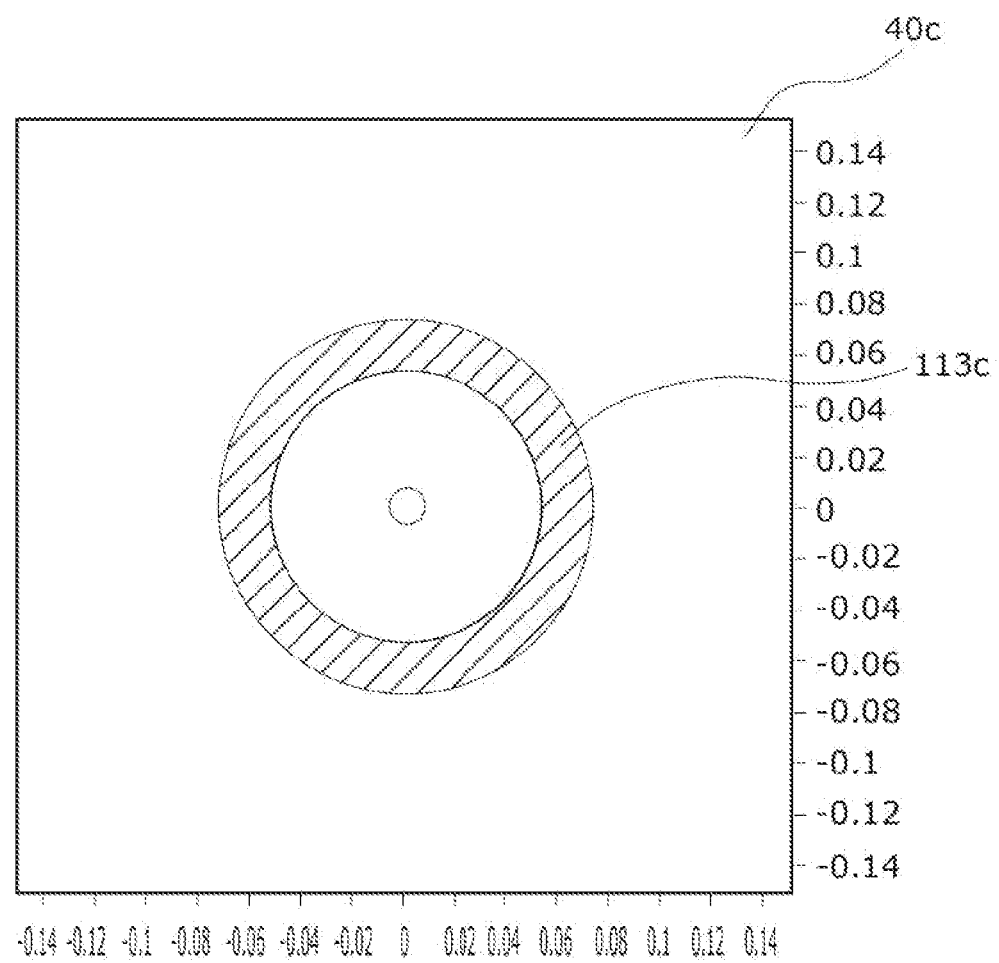
FIG. 18B is a schematic view illustrating a light intensity distribution of the laser beam transmitted through the optical fiber illustrated in FIG. 18A.

FIG. 18A is a schematic view illustrating how a laser beam transmitted through optical fiber 11C according to Embodiment 3 is caused to be incident on phosphor layer 40C. FIG. 18B is a schematic view illustrating a light intensity distribution of the laser beam transmitted through optical fiber 11C illustrated in FIG. 18A.

Here, in FIG. 17, laser element 83a causes a laser beam with a beam spot diameter (diameter of the laser beam) of 0.08 mm having a uniform luminance distribution to enter optical fiber 11C from a first end face of optical fiber 11C along the fiber axis of optical fiber 11C.

In addition, optical fiber 11C illustrated in FIG. 17 and FIG. 18A has a diameter (φ) of 0.1 mm, a length of 1 mm, and a refractive index of 1.5, and end face 112C of optical fiber 11C has a recess structure which is recessed by 0.03 mm at the center.

In order to check the profile of optical fiber 11C, the laser beam transmitted through this optical fiber 11C is caused to be incident on phosphor layer 40C as illustrated in FIG. 18A. It should be noted that the distance between phosphor layer 40C and end face 112C of optical fiber 11C is 0.05 mm, and phosphor layer 40C is 0.3 mm square and has the same structure as phosphor layer 40 described above.

In this case, as illustrated in FIG. 18B, light intensity distribution 113c the light beam caused to be incident on phosphor layer 40C has a substantially annular shape (substantially ring shape). In other words, light intensity distribution 113c of the light beam caused to be incident on phosphor layer 40C is sparse at the central region.

In this manner, by processing the end face of optical fiber 11C on the laser beam emission side such that the end face has a recess structure, it is possible to make the intensity distribution of the laser beam caused to be incident on phosphor layer 40C have a substantially annular shape even when the laser beam is incident straight; that is, incident along the fiber axis of optical fiber 11C.

It should be noted that, with illuminating device 1 according to the present embodiment, the laser beam transmitted through optical fiber 11C is also incident on phosphor layer 40 through optical connector 20, lens 70, and optical component 60. In optical connector 20, the laser beam transmitted through optical fiber 11 passes through optical component 130 which is a rod integrator. Since the rod integrator is configured in a cylindrical shape, i.e., axisymmetric, the angular distribution of the laser beam transmitted through optical fiber 11C is conserved. As a result, even when optical component 60 is not adjusted as described in Embodiment 1, a laser beam with an intensity distribution having a substantially annular shape enters phosphor layer 40, as a result of processing the end face on the laser beam emission side of optical fiber 11C into a recess structure.

The same applies to the case where the end face on the laser beam emission side of optical component 130 which is a rod integrator is processed such that the end face has the recess structure described above. In other words, even when the laser beam transmitted through optical fiber 11 whose end face is not processed is incident along the axis of optical component 130, optical component 130 is capable of causing the intensity distribution of the laser beam emitted through the end face on the laser beam emission side to have a substantially annular shape. As a result, the laser beam with an intensity distribution of a substantially annular shape enters phosphor layer 40.

Advantageous Effects, Etc.

As described above, illuminating device 1 according to the present embodiment includes laser element 83a that emits a laser beam; optical fiber 11C that transmits the laser beam emitted by laser element 83a; phosphor layer 40 that converts a wavelength of light incident on one of surfaces and emits the light through the one of the surfaces; and optical component 60 that causes reflected light of the laser beam transmitted through optical fiber 11C to be incident on the one of the surfaces of phosphor layer 40. With illuminating device 1 according to the present embodiment, an intensity distribution of the light incident on the one of the surfaces of phosphor layer 40 is sparse at a central region. The intensity distribution may be sparser toward a center of phosphor layer 40. Here, optical fiber 11C includes: an end face on one side close to laser element 83a; and an end face on an other side opposite to the one side, the end face on the other side being processed to have a recess structure in which a center is recessed, and the laser beam directly enters optical fiber 11C through the end face on the one side. More specifically, in the recess structure, the end face on the other side is processed to be increasingly recessed toward the center.

According to this configuration, a laser beam with an intensity distribution having a substantially annular shape is incident on phosphor layer 40, and thus the intensity distribution of the laser beam incident on phosphor layer 40 is averaged. As a result, the luminance saturation of phosphor layer 40 is inhibited. Accordingly, in addition to inhibiting an increase in the temperature of phosphor layer 40 and avoiding degradation, it is possible to increase an output by increasing the energy density of laser beams. Furthermore, since there is no restriction on the shape of the light source that emits laser beams, it is possible to reduce the size of illuminating device 1 according to the present embodiment.

In addition, since the intensity distribution of laser beams that are incident on phosphor layer 40 may be sparse at the central region in a form such as a substantially annular shape, and may further be sparser toward the center of phosphor layer 40, the energy density at the central region of one of the surfaces of phosphor layer 40 is small. As a result, it is easy to introduce a fail-safe mechanism such as diffusion processing. In other words, illuminating device 1 according to the present embodiment can support eye-safe.

(Other Variations, etc.)

Although Embodiments 1 to 3 have been described thus far, the present disclosure is not limited to the above-described Embodiments 1 to 3.

In addition, in the illuminating device according to the above-described Embodiments 1 to 3, the optical connector is detachable from the luminaire. However, the measure of attaching and detaching the optical connector is not limited to the above-described examples, and any known measures may be employed.

It should be noted that the present disclosure also includes other forms in which various modifications apparent to those skilled in the art are applied to Embodiments 1 to 3 or forms in which structural components and functions in Embodiments 1 to 3 are arbitrarily combined within the scope of the present disclosure.

The invention claimed is:

1. An illuminating device of a reflective type that uses a laser beam, the illuminating device comprising:
    a laser element that emits a laser beam;
    an optical fiber that transmits the laser beam emitted by the laser element;
    a phosphor layer that converts a wavelength of light incident on one of surfaces and emits the light through the one of the surfaces; and
    an optical component that causes reflected light of the laser beam transmitted through the optical fiber to be incident on the one of the surfaces of the phosphor layer, wherein
    the optical component causes an intensity distribution of the light incident on the one of the surfaces of the phosphor layer to be lower at a central region than at a periphery region, by causing the reflected light to be incident on the one of the surfaces without overlapping at a center of the one of the surfaces of the phosphor layer.

2. The illuminating device according to claim 1, wherein the intensity distribution becomes lower toward a center of the phosphor layer.

3. The illuminating device according to claim 1, wherein the intensity distribution has a substantially annular shape.

4. The illuminating device according to claim 1, wherein the optical fiber includes: an end face on one side close to the laser element; and an end face on an other side opposite to the one side, the end face on the other side being processed to have a recess structure in which a center is recessed, and the laser beam directly enters the optical fiber through the end face on the one side.

5. The illuminating device according to claim 4, wherein in the recess structure, the end face on the other side is processed to be increasingly recessed toward the center.

6. The illuminating device according to claim 1, wherein the optical component comprises at least two optical components, the laser element comprises at least two laser elements, the optical fiber comprises at least two optical fibers each of which transmits a laser beam emitted by a corresponding one of the at least two laser elements, and the at least two optical components cause laser beams transmitted respectively through the at least two optical fibers to be reflected, and cause reflected light of each of the laser beams to be incident on the one of the surfaces of the phosphor layer without overlapping at the center of the one of the surfaces.

7. The illuminating device according to claim 6, wherein the at least two optical components are mirrors.

8. The illuminating device according to claim 7, wherein the at least two optical components cause the reflected light of each of the laser beams to be incident on, in a substantially annular arrangement, the one of the surfaces of the phosphor layer without overlapping at all on the one of the surfaces.

9. The illuminating device according to claim 6, wherein the at least two optical components are reflective diffraction gratings.

10. The illuminating device according to claim 1, wherein the optical component is a reflective diffraction grating, and the reflective diffraction grating causes the laser beam transmitted through the optical fiber to be reflected, and causes reflected light of the laser beam to be incident on the one of the surfaces of the phosphor layer without overlapping at a center of the one of the surfaces.

11. An illuminating device of a reflective type that uses a laser beam, the illuminating device comprising:

at least two laser elements each of which emits a laser beam;

an optical fiber that transmits the laser beam emitted by each of the at least two laser elements;

a phosphor layer that converts a wavelength of light incident on one of surfaces and emits the light through the one of the surfaces;

an optical component that causes reflected light of the laser beam transmitted through the optical fiber to be incident on the one of the surfaces of the phosphor layer; and a lens located between the optical fiber and the at least two laser elements, wherein:

at least two laser beams respectively emitted by the at least two laser elements are incident on the lens at positions other than a center of the lens, and the lens causes an intensity distribution of the light incident on the one of the surfaces of the phosphor layer to be lower at a central region than at a periphery region, by causing the at least two laser beams incident thereon to obliquely enter the optical fiber within an angular range of a numerical aperture of the optical fiber.

12. The illuminating device according to claim 11, wherein the at least two laser beams respectively emitted by the at least two laser elements are line-symmetrically incident on the lens at positions other than the center of the lens.

* * * * *